(12) United States Patent
Gan et al.

(10) Patent No.: US 11,012,932 B2
(45) Date of Patent: May 18, 2021

(54) DATA COMMUNICATION METHOD AND APPARATUS

(71) Applicant: Huawei Technologies Co., Ltd., Shenzhen (CN)

(72) Inventors: Ming Gan, Shenzhen (CN); Meilu Lin, Shenzhen (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/397,693

(22) Filed: Apr. 29, 2019

(65) Prior Publication Data

US 2019/0253965 A1 Aug. 15, 2019

Related U.S. Application Data

(63) Continuation of application No. PCT/CN2017/107644, filed on Oct. 25, 2017.

(30) Foreign Application Priority Data

Oct. 29, 2016 (CN) .......................... 201610930719.4

(51) Int. Cl.
*H04W 52/02* (2009.01)
*H04W 80/02* (2009.01)
(Continued)

(52) U.S. Cl.
CPC ....... *H04W 52/0206* (2013.01); *H04W 48/08* (2013.01); *H04W 52/02* (2013.01);
(Continued)

(58) Field of Classification Search
CPC . H04W 52/0206; H04W 48/08; H04W 80/02; H04W 88/08; H04W 52/02
(Continued)

(56) References Cited

U.S. PATENT DOCUMENTS

2009/0310503 A1 12/2009 Tenny et al.
2012/0026997 A1 2/2012 Seok et al.
(Continued)

FOREIGN PATENT DOCUMENTS

CN 101420750 A 4/2009
CN 104737597 A 6/2015
(Continued)

OTHER PUBLICATIONS

Huang et al., "Specification Framework for Tgba," IEEE P802.11 Wireless LANs, pp. 1-9, Institute of Electrical and Electronics Engineers—New York, New York (Jul. 25, 2017).
(Continued)

*Primary Examiner* — Phong La
(74) *Attorney, Agent, or Firm* — Leydig, Voit & Mayer, Ltd.

(57) ABSTRACT

A data communication method and apparatus are provided. The data communication method includes: receiving, by a station (STA), a wake-up packet sent by an access point (AP), where the wake-up packet includes basic service set (BSS) parameter indication information, the BSS parameter indication information includes BSS parameter change indication information or a target parameter of a primary BSS to which a primary transceiver of the STA currently belongs, and the BSS parameter change indication information is used to indicate whether a critical parameter of the primary BSS changes when the primary transceiver of the STA is in a sleep state; and communicating, by the primary transceiver of the STA, with the AP based on the BSS parameter indication information. The embodiments of the present application can be used to effectively ensure that the primary transceiver of the STA successfully communicates with the AP.

22 Claims, 7 Drawing Sheets

(51) Int. Cl.
*H04W 88/08* (2009.01)
*H04W 48/08* (2009.01)
*H04W 84/12* (2009.01)

(52) U.S. Cl.
CPC ........... *H04W 80/02* (2013.01); *H04W 88/08* (2013.01); *H04W 84/12* (2013.01); *Y02D 30/70* (2020.08)

(58) Field of Classification Search
USPC ........................................................ 370/329
See application file for complete search history.

(56) References Cited

U.S. PATENT DOCUMENTS

| | | | |
|---|---|---|---|
| 2012/0263084 A1* | 10/2012 | Liu | H04W 28/08 370/311 |
| 2014/0185434 A1* | 7/2014 | Kim | H04L 41/0668 370/228 |
| 2014/0211678 A1 | 7/2014 | Jafarian et al. | |
| 2015/0173014 A1* | 6/2015 | Lee | H04W 74/006 370/311 |
| 2015/0223148 A1 | 8/2015 | Shi et al. | |
| 2016/0081130 A1* | 3/2016 | Wang | H04W 12/06 370/254 |
| 2016/0127995 A1 | 5/2016 | Merlin et al. | |
| 2016/0165637 A1 | 6/2016 | Kim et al. | |
| 2016/0295504 A1 | 10/2016 | Wang et al. | |
| 2016/0295512 A1* | 10/2016 | Hara | H04L 61/6081 |
| 2016/0345258 A1* | 11/2016 | Zhou | H04L 61/6022 |
| 2016/0353382 A1* | 12/2016 | Xue | H04W 72/1247 |
| 2017/0070948 A1 | 3/2017 | Kim et al. | |
| 2018/0110046 A1* | 4/2018 | Patil | H04W 74/006 |
| 2018/0220368 A1* | 8/2018 | Gidvani | H04W 76/12 |

FOREIGN PATENT DOCUMENTS

| | | |
|---|---|---|
| CN | 105165074 A | 12/2015 |
| CN | 105453686 A | 3/2016 |
| JP | 2014525716 A | 9/2014 |
| JP | 2015503874 A | 2/2015 |
| JP | 2015520970 A | 7/2015 |
| JP | 2015532571 A | 11/2015 |
| JP | 2016531496 A | 10/2016 |
| KR | 20150058200 A | 5/2015 |
| WO | 2015072053 A1 | 5/2015 |
| WO | 2016191605 A1 | 12/2016 |

OTHER PUBLICATIONS

JP/2019522749, Office Action, dated Aug. 17, 2020.
JP/2019-522749, Notice of Reasons for Rejection, dated Mar. 1, 2021.

* cited by examiner

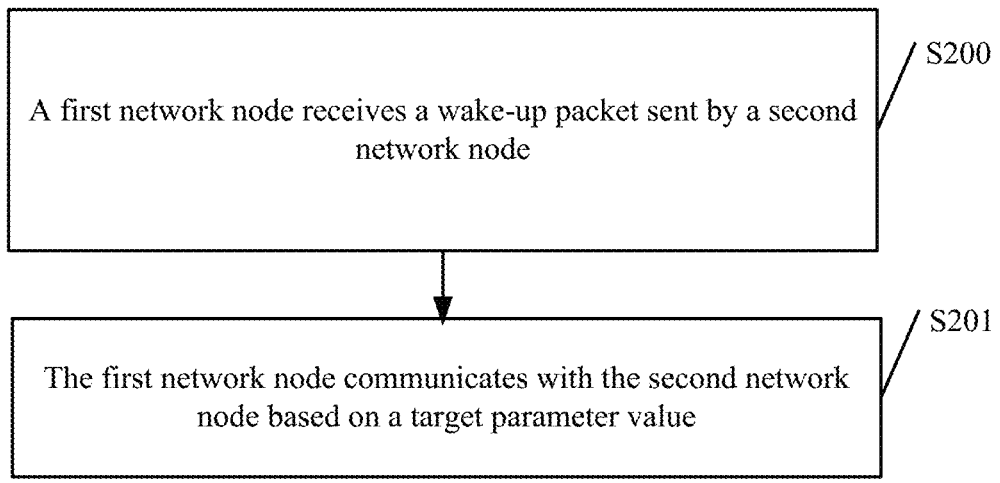
FIG. 11
| Control field | Request type | Target wake-up time | TWT group assignment | Minimum TWT wake duration | TWT wake interval mantissa | TWT channel | NDP paging (optional) |
FIG. 12
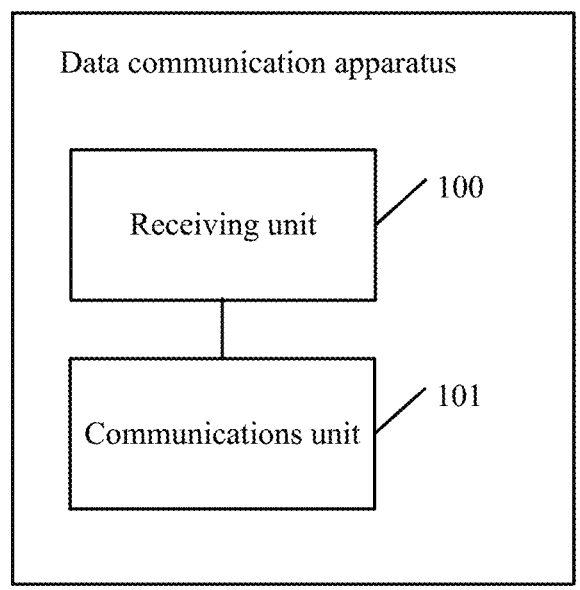
FIG. 13a

DATA COMMUNICATION METHOD AND APPARATUS

CROSS-REFERENCE TO RELATED APPLICATIONS

This application is a continuation of International Application No. PCT/CN2017/107644, filed on Oct. 25, 2017, which claims priority to Chinese Patent Application No. 201610930719.4, filed on Oct. 29, 2016. The disclosures of the aforementioned applications are incorporated herein by reference in their entireties.

TECHNICAL FIELD

Embodiments of the present invention relate to the field of wireless network technologies, and in particular, to a data communication method and apparatus.

BACKGROUND

On a Wireless Fidelity (\ Wi-Fi) network, quite a part of energy of a device is wasted in idle listening. A related solution in current legacy 802.11 protocols (802.11b, 802.11a, 802.11g, 802.11n, 802.11ac, and the like) focuses on optimizing a sleep policy of the device. In addition to optimizing the sleep policy, there is another technical approach for reducing an energy waste in idle listening of the device: using a low-power wake-up receiver (LP-WUR) (WUR for short herein). A core concept of the technical approach is: A receive-end device (for example, a STA) further includes a low-power wake-up receiver (WUR) part in addition to a legacy 802.11 transceiver end (or referred to as an 802.11 main radio, an 802.11 primary transceiver module, or a Wi-Fi primary transceiver module). As shown in FIG. 3, after the 802.11 primary transceiver module goes to deep sleep, the low-power WUR wakes up and starts to work. If another device (for example, an AP on the left of FIG. 3) needs to communicate with a device that has a WUR and an 802.11 primary transceiver module (for example, a STA on the right of FIG. 3), the AP first sends a WUR wake-up packet (WUP) to the WUR. After correctly receiving the WUP sent to the WUR, the WUR wakes up the 802.11 primary transceiver module of the STA, and then the WUR itself goes to sleep. In this case, the AP communicates with the 802.11 primary transceiver module that is awake. After finishing communicating with the AP, the 802.11 primary transceiver module goes to sleep. At the same time, the WUR wakes up and starts listening again to detect whether there is a WUP sent to the WUR, so as to wake up the 802.11 primary transceiver module.

In the technology, the low-power WUR is used to replace the 802.11 primary transceiver module to listen on a channel when a medium is idle (energy consumption of the WUR in a listening or receiving state is expected to be about 0.1% to 1% that of the 802.11 primary transceiver module, that is, less than 100 uW), so that an energy waste during idle listening of the device can be effectively reduced.

However, the primary transceiver of the STA that is equipped with the wake-up receiver usually has a relatively small duty cycle. In other words, the primary transceiver of the STA sleeps for a relatively long time, usually for several days and even several months. During sleep, a parameter of a primary BSS to which the primary transceiver of the STA belongs changes. For example, a transmission channel between the AP and the primary transceiver of the STA changes to another channel. In this case, after being woken up, the primary transceiver of the STA still uses the original channel to communicate with the AP. As a result, the communication fails.

SUMMARY

Embodiments of the present application provide a data communication method and apparatus, where an AP can send BSS parameter indication information to a STA by using a wake-up packet, thereby effectively ensuring that a primary transceiver of the STA successfully communicates with the AP.

According to a first aspect, an embodiment of the present application provides a data communication method, the method is executed by a station (STA), and the STA interacts with an AP associated with the STA. The AP sends BSS parameter indication information to the STA, to ensure that a primary transceiver of the STA can successfully communicate with the AP after waking up. Optionally, the station STA receives a wake-up packet sent by the access point AP, where the wake-up packet includes basic service set (BSS) parameter indication information, the BSS parameter indication information includes BSS parameter change indication information or a target parameter of a primary BSS to which a primary transceiver of the STA currently belongs, and the BSS parameter change indication information is used to indicate whether at least one critical parameter of the primary BSS changes when the primary transceiver of the STA is in a sleep state; and the primary transceiver of the STA communicates with the AP based on the BSS parameter indication information.

In a possible design, the wake-up packet is sent to the STA by the AP in a unicast manner, for example, when the AP needs to wake up a specific STA, the AP sends a wake-up packet to the STA, where the wake-up packet includes the BSS parameter indication information; or the wake-up packet is sent to the STA by the AP in a broadcast manner or in a multicast manner, for example, the wake-up packet is a wake-up beacon frame, where the wake-up beacon frame includes the BSS parameter indication information. When the STA changes from the sleep state to an awake state, the STA may communicate with the AP based on the BSS parameter indication information.

In another possible design, the BSS parameter change indication information includes a first change count value counted by the AP, and the first change count value is used to represent a quantity of change times of the at least one critical parameter of the primary BSS; the STA detects whether a second change count value maintained by the STA is the same as the first change count value, where the second change count value is used to represent a quantity of change times of the at least one critical parameter of the primary BSS when the primary transceiver of the STA is in a historical awake state; if the second change count value is different from the first change count value, the at least one critical parameter of the primary BSS changes when the primary transceiver of the STA is in the sleep state; and when the primary transceiver of the STA changes from the sleep state to an awake state, the primary transceiver of the STA obtains at least one latest critical parameter of the primary BSS, and communicates with the AP based on the at least one latest critical parameter.

In another possible design, the BSS parameter change indication information includes a change identifier, and the change identifier is used to indicate whether the at least one critical parameter of the primary BSS changes when the STA is in the sleep state; the STA reads a value of the change identifier in the wake-up packet; if the value of the change identifier is a first preset value, the at least one critical parameter of the primary BSS changes, where the first preset value is used to indicate that the at least one critical parameter of the primary BSS changes; and when the primary transceiver of the STA changes from the sleep state to an awake state, the primary transceiver of the STA obtains at least one latest critical parameter of the primary BSS, and communicates with the AP based on the at least one latest critical parameter.

In addition, the BSS parameter indication information carried in the wake-up packet includes the BSS parameter change indication information, and the BSS parameter change indication information includes at least one latest value of a critical parameter that changes and that is in the at least one critical parameter of the primary BSS to which the primary transceiver of the STA belongs. In other words, the at least one latest value is used to indicate that the at least one critical parameter of the primary BSS changes when the primary transceiver of the STA is in the sleep state.

In another possible design, the STA sends a probe request frame to the AP, where the probe request frame is used to request the at least one latest critical parameter of the primary BSS; and the STA receives a probe response frame returned by the AP, where the probe response frame carries the at least one latest critical parameter of the primary BSS.

In another possible design, the BSS parameter indication information includes the target parameter of the primary BSS to which the primary transceiver of the STA currently belongs, and the target parameter includes a beacon frame parameter; and the beacon frame parameter includes at least one of an arrival time of a next beacon frame and a beacon frame interval.

In another possible design, the BSS parameter indication information includes the target parameter of the primary BSS to which the primary transceiver of the STA currently belongs, and the target parameter includes a channel parameter of the primary BSS; and the channel parameter of the primary BSS includes at least one of a channel number, a secondary channel offset indication, a channel bandwidth, a channel central frequency, and a frequency band number of the primary BSS.

In another possible design, the BSS parameter indication information includes the target parameter of the primary BSS to which the primary transceiver of the STA currently belongs, and the target parameter includes an enhanced distributed channel access (EDCA) parameter of a contention channel of the primary BSS; and the EDCA parameter of the primary BSS includes at least one of quality of service QoS information, an access category best effort traffic (AC_BE) parameter, an access category background traffic (AC_BK) parameter, an access category video traffic (AC_VI) parameter, and an access category voice traffic (AC_VO) parameter of the contention channel of the primary BSS.

According to a second aspect, an embodiment of the present application provides a data communication method. The method is executed by a first network node, and the first network node interacts with a second network node. Therefore, the second network node notifies the first network node of a target parameter value obtained after a communications parameter is updated. Optionally, the first network node may be an AP or a STA. If the first network node is an AP, the second network node is a STA; or if the first network node is a STA, the second network node is an AP. For example, the first network node receives a wake-up packet sent by the second network node, where the wake-up packet includes a target parameter value, the target parameter value is an updated value of a communications parameter between the first network node and the second network node, and the communications parameter includes at least one parameter in a target wake up time TWT element and/or a transmission operation mode parameter of the second network node; and the first network node communicates with the second network node based on the target parameter value.

In a possible design, if the communications parameter includes a target wake up time in the TWT element, the first network node adjusts, based on the target parameter value, a target awake time point at which a primary transceiver of the first network node performs communication with the second network node, and communicates with the second network node.

In another possible design, if the communications parameter includes a minimum TWT wake duration in the TWT element, the first network node adjusts, based on the target parameter value, minimum awake duration during which a primary transceiver of the first network node performs communication with the second network node, and communicates with the second network node.

In another possible design, if the communications parameter includes a TWT wake interval mantissa (TWT Wake Interval Mantissa) and a TWT wake interval exponent (TWT Wake Interval Exponent) in the TWT element, the first network node adjusts, based on the target parameter value, an awake period interval at which a primary transceiver of the first network node performs communication with the second network node, and communicates with the second network node.

In another possible design, the wake-up packet includes a TWT parameter overloading field, and the TWT parameter overloading field includes a parameter overloading bit; and when the parameter overloading bit indicates TWT parameter overloading, the TWT parameter overloading field includes the target parameter value that is the at least one updated parameter in the TWT element. The first network node adjusts, based on the target parameter value, a parameter for a primary transceiver of the first network node to perform communication with the second network node, and communicates with the second network node.

In another possible design, the transmission operation mode parameter of the second network node includes a maximum quantity of transmittable streams and transmit power information; and the transmit power information is a maximum transmit power of the second network node or transmit power fluctuation indication information of the second network node, where the transmit power fluctuation indication information is used to indicate whether transmit power fluctuation is allowed during data transmission of the second network node.

According to a third aspect, an embodiment of the present application provides a data communication apparatus, applied to a STA. The data communication apparatus includes a receiving unit and a communications unit. The receiving unit is configured to receive a wake-up packet sent by an access point AP, where the wake-up packet includes basic service set (BSS) parameter indication information, the BSS parameter indication information includes BSS parameter change indication information or a target parameter of a primary BSS to which a primary transceiver of the STA currently belongs, and the BSS parameter change indication information is used to indicate whether at least one critical parameter of the primary BSS changes when the primary transceiver of the STA is in a sleep state. The communications unit is configured to communicate with the AP based on the BSS parameter indication information.

According to a fourth aspect, an embodiment of the present application provides a data communication apparatus, applied to a first network node. The data communication apparatus includes a receiving unit and a communications unit. The receiving unit is configured to receive a wake-up packet sent by a second network node, where the wake-up packet includes a target parameter value, the target parameter value is an updated value of a communications parameter between the first network node and the second network node, and the communications parameter includes at least one parameter in a target wake up time TWT element and/or a transmission operation mode parameter of the second network node. The communications unit is configured to communicate with the second network node based on the target parameter value.

According to a fifth aspect, an embodiment of the present application provides a data communication apparatus, applied to a STA. The data communication apparatus includes a memory, configured to store computer executable program code; a transceiver; and a processor, coupled with the memory and the transceiver.

The program code includes an instruction. When the processor executes the instruction, the instruction enables the data communication apparatus to perform the following operations: receiving a wake-up packet sent by an access point AP, where the wake-up packet includes basic service set BSS parameter indication information, the BSS parameter indication information includes BSS parameter change indication information or a target parameter of a primary BSS to which a primary transceiver of the STA currently belongs, and the BSS parameter change indication information is used to indicate whether at least one critical parameter of the primary BSS changes when the primary transceiver of the STA is in a sleep state; and communicating with the AP based on the BSS parameter indication information.

According to a sixth aspect, an embodiment of the present application provides a data communication apparatus, applied to a first network node. The data communication apparatus includes a memory, configured to store computer executable program code; a transceiver; and a processor, coupled with the memory and the transceiver.

The program code includes an instruction. When the processor executes the instruction, the instruction enables the data communication apparatus to perform the following operations: receiving a wake-up packet sent by a second network node, where the wake-up packet includes a target parameter value, the target parameter value is an updated value of a communications parameter between the first network node and the second network node, and the communications parameter includes at least one parameter in a target wake up time TWT element and/or a transmission operation mode parameter of the second network node; and communicating with the second network node based on the target parameter value.

According to a seventh aspect, an embodiment of the present application provides a computer storage medium, configured to store a computer software instruction used by the data communication apparatus in the third aspect or the data communication apparatus in the fifth aspect, where the computer software instruction is used to execute the method provided in any one of the first aspect or the possible designs of the first aspect.

According to an eighth aspect, an embodiment of the present application provides a computer storage medium, configured to store a computer software instruction used by the data communication apparatus in the fourth aspect, where the computer software instruction includes a program designed to execute any one of the second aspect or the possible designs of the second aspect.

According to a ninth aspect, an embodiment of the present application provides a data communication method. A first network node receives a wake-up packet sent by a second network node, where the wake-up packet includes cancellation instruction information, and the cancellation instruction information is used to instruct to cancel a target wake up time TWT that is pre-established between the first network node and the second network node; and a primary transceiver of the first network node communicates with the second network node based on the cancellation instruction information.

According to a tenth aspect, an embodiment of the present application provides a data communication apparatus, applied to a first network node. The data communication apparatus includes a receiving unit and a communications unit. The receiving unit is configured to receive a wake-up packet sent by a second network node, where the wake-up packet includes cancellation instruction information, and the cancellation instruction information is used to instruct to cancel a target wake up time TWT that is pre-established between the first network node and the second network node.

The communications unit is configured to communicate with the second network node based on the cancellation instruction information.

According to an eleventh aspect, an embodiment of the present application provides a computer instruction, where the computer software instruction is used to execute the method provided in any one of the first aspect or the possible designs of the first aspect.

In the embodiments of the present application, the STA receives the wake-up packet sent by the AP, where the wake-up packet includes the BSS parameter indication information, the BSS parameter indication information includes the BSS parameter change indication information or the target parameter of the primary BSS to which the primary transceiver of the STA currently belongs, and the BSS parameter change indication information is used to indicate whether the critical parameter of the primary BSS changes when the primary transceiver of the STA is in the sleep state; and the primary transceiver of the STA communicates with the AP based on the BSS parameter indication information. In this manner, the BSS parameter indication information is sent to the STA by using the wake-up packet, so that the STA can accurately learn of a current critical parameter of the primary BSS, thereby effectively ensuring that the primary transceiver of the STA successfully communicates with the AP after waking up.

BRIEF DESCRIPTION OF DRAWINGS

To describe the technical solutions in the embodiments of the present application or in the background more clearly, the following briefly describes the accompanying drawings required for describing the embodiments of the present application or the background.

FIG. 11 is a flowchart of another data communication method according to an embodiment of the present application;

FIG. 12 is a schematic diagram of a TWT element according to an embodiment of the present application;

FIG. 13a is a schematic structural diagram of a data communication apparatus according to an embodiment of the present application;

DESCRIPTION OF EMBODIMENTS

The following describes the embodiments of the present application with reference to the accompanying drawings in the embodiments of the present application.

The embodiments of the present application may be applied to a wireless local area network (WLAN). Currently, IEEE (Institute of Electrical and Electronics Engineers) 802.11 series standards are used for the WLAN. The WLAN may include a plurality of basic service sets (BSS), and network nodes in the BSSs are stations. The stations include an access point (AP) station and a non-access point station (Non-AP STA for short). Each basic service set may include one AP and a plurality of non-AP STAs associated with the AP. It should be noted that, all STAs in the embodiments of the present application are non-access point stations, and all APs in the embodiments of the present application are access point stations.

The access point station is also referred to as a wireless access point, a hotspot, or the like. The AP, with a typical coverage radius of tens to hundreds of meters, is an access point for connecting a user to a wired network, and is mainly deployed inside a house, a building, and a campus, and certainly may also be deployed outdoors. The AP, equivalent to a bridge that connects a wired network and a wireless network, is mainly used to connect various wireless network clients together, and then connect the wireless network to an Ethernet. Specifically, the AP may be a terminal device or network device with a Wi-Fi (Wireless Fidelity) chip. Optionally, the AP may be a device that supports the 802.11ax standard. Further, optionally, the AP may be a device that supports various WLAN standards such as 802.11ac, 802.11n, 802.11g, 802.11b, and 802.11a.

The non-access point station (Non-AP STA for short) may be a wireless communications chip, a wireless sensor, or a wireless communications terminal, for example, a mobile phone that supports a Wi-Fi communications function, a tablet computer that supports a Wi-Fi communications function, a set top box that supports a Wi-Fi communications function, a smart television that supports a Wi-Fi communications function, a smart wearable device that supports a Wi-Fi communications function, an in-vehicle communications device that supports a Wi-Fi communications function, or a computer that supports a Wi-Fi communications function. Optionally, the STA can support the 802.11ax standard. Further, optionally, the station supports various WLAN standards such as 802.11ac, 802.11n, 802.11g, 802.11b, and 802.11a.

With evolution of the wireless local area network WLAN standards, the IEEE 802.11 task groups are preparing for study and development work of 802.11 standards of using a low-power wake-up receiver (LP-WUR) as a core technology to reduce power consumption. An SG (study group) has established in IEEE for the 802.11 standards in June 2016, and a TG (Task Group) is expected to be established by the end of 2016 for a project known as WUR for short.

Figure 2:
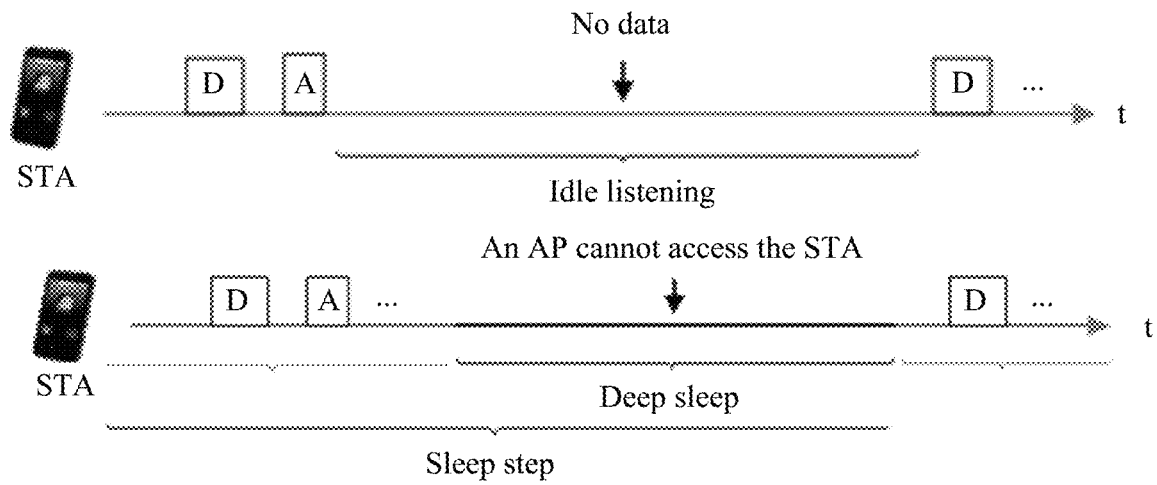
FIG. 2 is a schematic diagram of a conventional signal listening and sleep policy according to an embodiment of the present application.

On a Wi-Fi network, quite a part of energy of a device is wasted in idle listening. A related solution in current legacy 802.11 protocols (802.11b, 802.11a, 802.11g, 802.11n, 802.11ac, and the like) focuses on optimizing a sleep policy of the device. As shown in a first time axis in FIG. 2, if a channel is listened on continuously when a device (such as a workstation, a STA, or a Station) does not receive or send a message (for example, in a No data stage) (that is, idle listening), considerable energy is consumed. Therefore, a sleep schedule is introduced to a second time axis in FIG. 2, so that the STA can go to deep sleep when no data is received or sent, to reduce energy consumption of continuous idle listening. However, when the STA is in deep sleep, the AP cannot communicate with the STA, and transmission between the two can be performed only after the STA wakes up. This may cause a specific latency. To avoid a large latency caused by the sleep schedule, the STA usually wakes up from time to time by following a specific sleep policy, to check whether there is data that needs to be received, but this reduces sleep efficiency of the STA (compared with long-time sleep, more energy is consumed if the STA wakes up from time to time but has no useful data that needs to be received or sent).

Figure 3:
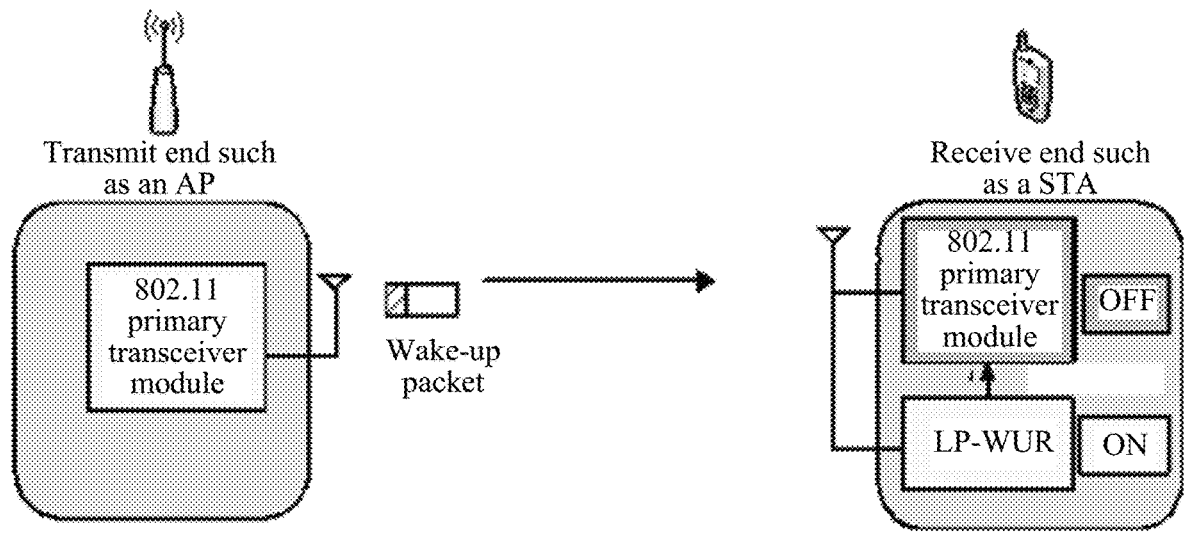
FIG. 3 is a possible schematic structural diagram of a low-power wake-up receiver and a transmitter according to an embodiment of the present application.

In addition to optimizing the sleep policy, there is another technical approach for reducing an energy waste in idle listening of the device: using a low-power wake-up receiver (LP-WUR) (WUR for short herein). A core concept of the technical approach is: A receive-end device (such as a STA) further includes a low-power wake-up receiver (WUR) part in addition to a legacy 802.11 transceiver end (an 802.11 main radio, an 802.11 primary transceiver module, or a Wi-Fi primary transceiver module). As shown in FIG. 3, after the 802.11 primary transceiver module goes to deep sleep, the low-power WUR wakes up and starts to work. If another device (for example, an AP on the left of FIG. 3)

needs to communicate with a device that has a WUR and an 802.11 primary transceiver module (for example, a STA on the right of FIG. 3), the AP first sends a WUR wake-up packet (WUP, or referred to as a wake-up frame) to the WUR. After correctly receiving the WUP sent to the WUR, the WUR wakes up the 802.11 primary transceiver module of the STA, and then the WUR itself goes to sleep. In this case, the AP communicates with the 802.11 primary transceiver module that is awake. After finishing communicating with the AP, the 802.11 primary transceiver module goes to sleep. At the same time, the WUR wakes up and starts listening again to detect whether there is a WUP sent to the WUR, so as to wake up the 802.11 primary transceiver module.

In the technology, the low-power WUR is used to replace the 802.11 primary transceiver module to listen on a channel when a medium is idle (energy consumption of the WUR in a listening or receiving state is expected to be about 0.1% to 1% that of the 802.11 primary transceiver module, that is, less than 100 uW), so that an energy waste during idle listening of the device can be effectively reduced.

To implement low power consumption, a circuit construction, a frame structure design (such as a WUP), and the like of the WUR need to be relatively simple and low in complexity. For example, a WUR circuit structure may include only an energy detect part and a radio frequency (RF) part, and therefore some complex modulation manners cannot be demodulated. Therefore, an easy-to-implement on-off keying (OOK) modulation manner, binary phase shift keying (BPSK) modulation manner, or frequency shift keying (FSK) modulation manner may be used for the WUP.

Figure 4A:
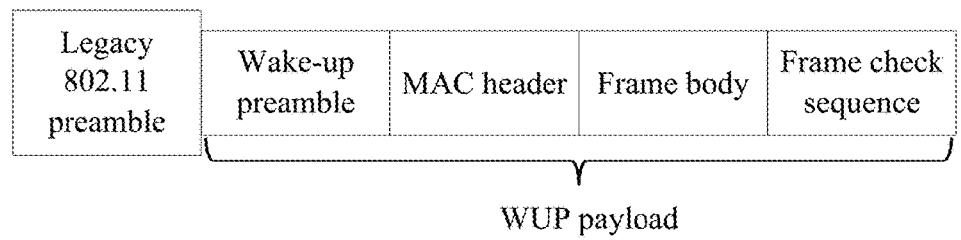
FIG. 4a is a schematic diagram of a frame structure of a wake-up packet according to an embodiment of the present application.

A possible WUP frame structure is shown in FIG. 4a. In the front, there is a 802.11 legacy preamble (802.11 legacy preamble), which can be understood by another surrounding 802.11 device (the surrounding 802.11 device that detects the preamble does not preempt a channel in a period of time), and is used to protect a subsequent part of the wake-up packet against interference from a legacy 802.11 device. In the rear, there is a WUP payload part, which is modulated by using OOK, and can be understood by only the WUR. The WUP payload part may include a wake-up preamble (used to recognize a WUP signal), a MAC header (including a WUR ID, used to distinguish different WURs), a frame body (a frame carrier that can carry some other information), and an FCS (Frame Check Sequence, used to ensure that received data is the same as sent data). The WUR ID herein may be a partial or complete station association identifier, or a WUR identifier of the station allocated by the AP, or a receiver MAC address of the station or a partial receiver MAC address, or other information that may be used to distinguish WURs of different stations. In addition, different from the 802.11 legacy preamble that is transmitted in a basic unit of 20 M bandwidth, the WUP payload part may be transmitted by using a narrowband. For example, the narrowband may be 1 M, 2 M, 4 M, 8 M, and 16 M. The WUP payload part may also be transmitted in a basic unit of 20 M bandwidth.

Figure 4B:
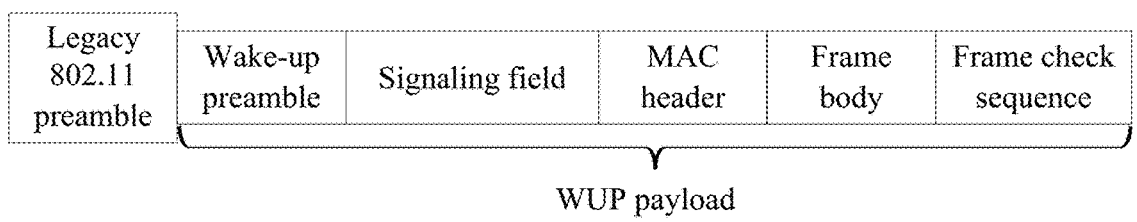
FIG. 4b is a schematic diagram of a frame structure of another wake-up packet according to an embodiment of the present application.

FIG. 4b shows another possible WUP frame structure, which includes a 802.11 legacy preamble, a wake-up preamble, a signaling field (used to carry some physical layer signaling, such as an AP identifier, a WUR ID, and a modulation and coding scheme indication), a MAC header, a frame body, and a frame check sequence.

The primary transceiver of the STA that is equipped with the wake-up receiver usually has a relatively small duty cycle. In other words, the primary transceiver of the STA sleeps for a relatively long time, usually for several days and even several months. However, in the sleep time, a critical parameter of a primary BSS to which the primary transceiver of the STA belongs changes, that is, a BSS critical parameter managed by the AP changes. For example, a transmission channel between the AP and the primary transceiver of the STA changes to another channel. After being woken up, the primary transceiver of the STA still uses the original channel to communicate with the AP. In this case, the communication fails. A main objective of the present application is to resolve this problem, and a main solution is that an AP sends BSS parameter indication information to a STA by using a wake-up packet, and the STA may communicate with the AP by using the BSS parameter indication information.

Certainly, the BSS critical parameter is not limited to a channel number (of a primary channel), and further includes a timestamp, a frequency band number, a bandwidth central frequency, an enhanced distributed channel access (EDCA) parameter, an arrival time of a beacon frame, a beacon frame interval, and the like. For example, because the STA sleeps for a relatively long time, an inner clock is shifted, that is, the inner clock is different from a clock of the AP. Then, the AP sends a wake-up packet to the wake-up receiver of the STA, and requires that the primary transceiver of the STA wakes up at a moment T1. However, due to a clock shift problem, the primary transceiver of the STA wakes up at an incorrect time. This causes a communication failure.

Figure 1:
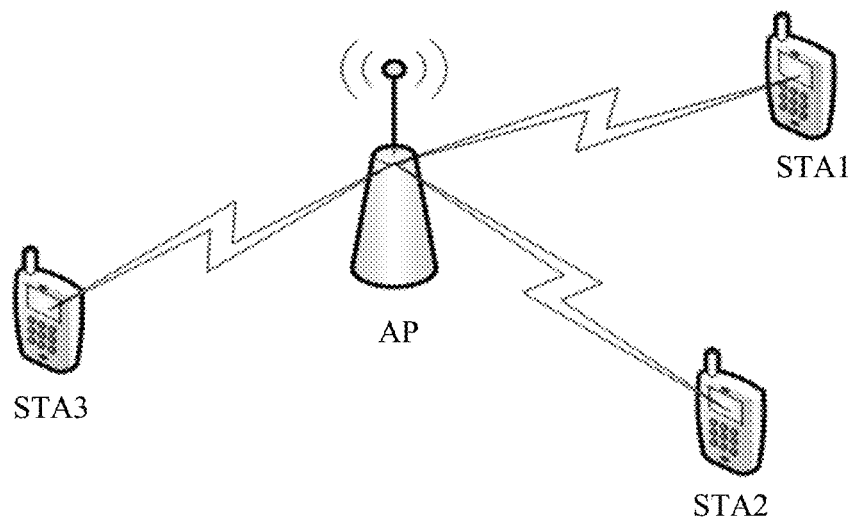
FIG. 1 is a schematic diagram of an application scenario according to an embodiment of the present application.

FIG. 1 is a schematic diagram of a system in a typical WLAN deployment scenario, including one AP and three STAs associated with the AP. The AP may communicate with a STA1, a STA2, and a STA3 separately. It should be noted that each STA may have a structure shown in FIG. 3, that is, include both an 802.11 primary transceiver module and an LP-WUR module, where the LP-WUR module is configured to receive a wake-up packet sent by the AP, and wake up the 802.11 primary transceiver module.

In the embodiments of the present application, an AP sends a wake-up packet to at least one station STA that is associated with the AP, for example, sends a wake-up packet to at least one of the STA1, the STA2, and the STA3 in FIG. 1, where the wake-up packet includes BSS parameter indication information, the BSS parameter indication information includes BSS parameter change indication information or a target parameter of a primary BSS to which a primary transceiver of the STA currently belongs, and the BSS parameter change indication information is used to indicate whether a critical parameter of the primary BSS changes when the primary transceiver of the STA is in a sleep state; and the primary transceiver of the STA communicates with the AP based on the BSS parameter indication information. This ensures that the primary transceiver of the STA can successfully communicate with the AP after waking up.

The following describes data communication methods provided in the embodiments of the present application with reference to FIG. 5 to FIG. 12.

Figure 5:
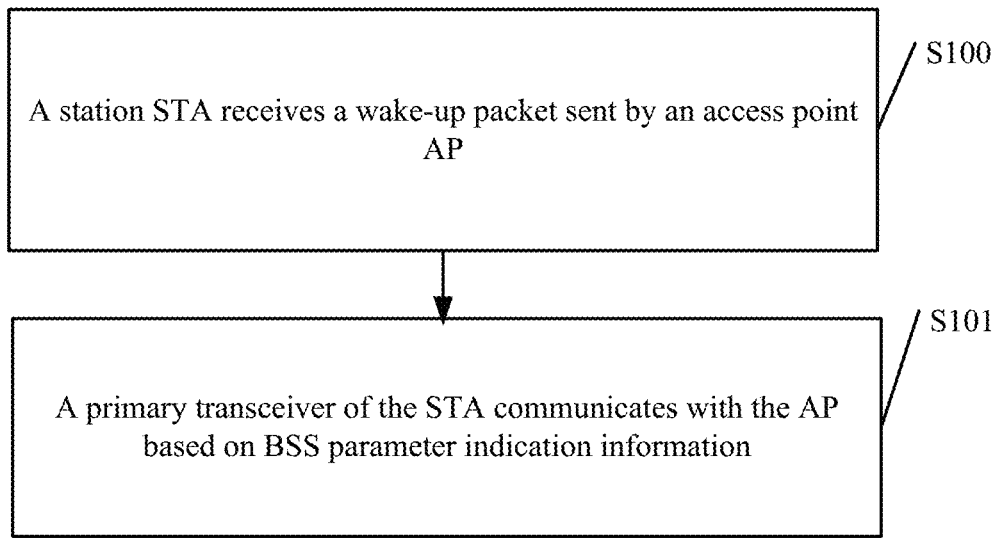
FIG. 5 is a flowchart of a data communication method according to an embodiment of the present application.

FIG. 5 is a schematic flowchart of a data communication method according to an embodiment of the present application. In this embodiment of the present application, the method is executed by a STA. As shown in FIG. 5, the data communication method in this embodiment of the present application includes steps S100 and S101.

S100. The station (STA) receives a wake-up packet sent by an access point (AP), where the wake-up packet includes basic service set (BSS) parameter indication information, the BSS parameter indication information includes BSS parameter change indication information or a target parameter of a primary BSS to which a primary transceiver of the STA currently belongs, and the BSS parameter change indication information is used to indicate whether at least one critical parameter of the primary BSS changes when the primary transceiver of the STA is in a sleep state.

S101. The primary transceiver of the STA communicates with the AP based on the BSS parameter indication information.

Figure 6:
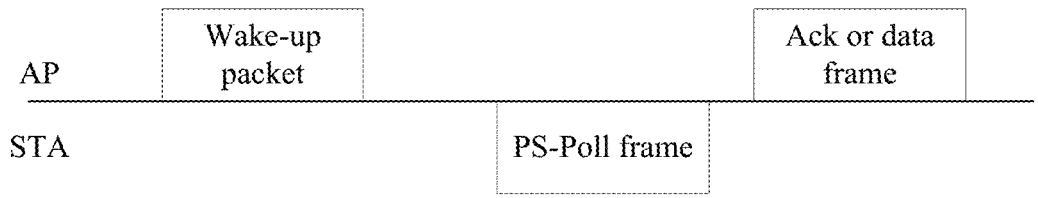
FIG. 6 is a schematic diagram of a station waking-up process according to an embodiment of the present application.

In this embodiment of the present application, as shown in FIG. 6, the AP sends a wake-up packet to a single STA. After receiving the wake-up packet, the STA is triggered to wake up the primary transceiver. After a time of transition from sleep to being woken up, the STA sends a PS-Poll frame or an acknowledgement frame to the AP, to notify the AP that the STA has woken up. Then, the AP returns an acknowledgement (Ack) frame or directly transfers data to the STA. In addition, in FIG. 6, the AP may alternatively directly send a data frame to the STA after the STA is woken up, without waiting for the STA to send the PS-Poll frame. It should be noted that the wake-up packet may be sent to the STA by the AP in a unicast manner, or may be sent to a plurality of STAs by the AP in a multicast or broadcast manner. For example, the wake-up packet is a wake-up beacon frame. The wake-up beacon frame has a structure similar to that of an 802.11 beacon frame, and is formed by connecting elements in series. The wake-up beacon frame is periodically broadcast like the 802.11 beacon frame, and includes a corresponding parameter of wake-up radio. To help the primary transceiver work normally after being woken up, the wake-up beacon frame still needs to carry a critical parameter of the primary BSS to which the primary transceiver currently belongs or a change indication field.

During sleep time of the primary transceiver of the STA, one or more critical parameter of the primary BSS to which the AP and the primary transceiver of the STA belong may change, for example, a channel number (of a primary channel), a timestamp, a frequency band number, a bandwidth central frequency, an EDCA parameter, an arrival time of a beacon frame, and a beacon frame interval. To ensure that the primary transceiver of the STA can normally work after being woken up, if all BSS parameters of the primary BSS are added to the wake-up packet to notify the STA that needs to be woken up to ensure that the primary transceiver of the STA can normally work after being woken up, Consequently, the wake-up packet is excessively long. The present application needs to simplify the wake-up packet and ensure that the STA that is woken up can perform normal communication.

The wake-up packet in this embodiment of the present application includes the BSS parameter indication information, the BSS parameter indication information may be the BSS parameter change indication information that is used to indicate whether the at least one critical parameter of the primary BSS to which the primary transceiver of the STA belongs changes when the primary transceiver of the STA is in the sleep state. For example, the BSS parameter change indication information may be a change count value that is counted by the AP and that is used to represent a quantity of change times of the critical parameter of the primary BSS, or the BSS parameter change indication information may be a change identifier delivered to the STA by the AP, or the BSS parameter change indication information may be a latest value of a critical parameter that is in the critical parameter of the primary BSS and that changes when the primary transceiver of the STA is in the sleep state.

In addition, the BSS parameter indication information may alternatively be the target parameter of the primary BSS to which the primary transceiver of the STA currently belongs. The target parameter may be a preset critical parameter, for example, at least one critical parameter that may change and that is preset based on an empirical value; or the target parameter may be a non-critical parameter of the primary BSS. This is not limited in the present application. Each time the AP delivers a wake-up packet to the STA, the wake-up packet includes the target parameter. Certainly, the target parameter may include a parameter that does not change.

In an optional implementation, the BSS parameter indication information includes the BSS parameter change indication information, the BSS parameter change indication information includes a first change count value counted by the AP, and the first change count value is used to represent a quantity of change times of the critical parameter of the primary BSS. The AP periodically broadcasts the first change count value, or sends a unicast frame to notify a single station of the first change count value. For example, the first change count value is carried in a beacon frame (beacon) or an association response frame. After the primary transceiver of the station sleeps, the AP still adds the first change count value to the wake-up packet, to send the first change count value to a wake-up receiver of the station that needs to be woken up, or adds the first change count value to a frame such as a wake-up beacon frame, to notify, in a broadcast manner, a sleeping station that is equipped with a wake-up receiver.

That the primary transceiver of the STA communicates with the AP based on the BSS parameter indication information includes the following step 1 to step 3.

Step 1: The STA detects whether a second change count value maintained by the STA is the same as the first change count value, where the second change count value is used to represent a quantity of change times of the critical parameter of the primary BSS when the primary transceiver of the STA is in a historical awake state.

The action of detecting whether the second change count value maintained by the STA is the same as the first change count value may be performed after the STA receives the wake-up packet, that is, performed in a period in which the primary transceiver changes from the sleep state to an awake state; or may be performed after the primary transceiver of the STA is woken up.

Step 2: If the second change count value is different from the first change count value, the critical parameter of the primary BSS changes when the primary transceiver of the STA is in the sleep state.

Step 3: When the primary transceiver of the STA changes from the sleep state to an awake state, the primary transceiver of the STA obtains a latest critical parameter of the primary BSS, and communicates with the AP based on the latest critical parameter.

In an embodiment, the wake-up packet carries the BSS parameter change indication information, the BSS parameter change indication information includes the first change count value counted by the AP, and the first change count value may represent a quantity of change times of the critical parameter of the primary BSS. For example, if a change of the critical parameter of the primary BSS has occurred, the first change count value is incremented by a fixed preset value, where the fixed preset value may be 1, 2, 3, or the like.

In addition, each STA also has a second change count value, where the second change count value is used to represent a quantity of change times of the critical parameter of the primary BSS when the primary transceiver of the STA is in a historical awake state. That is, when the primary transceiver of the STA is in the sleep state, the second change count value no longer changes, and even if the critical parameter of the primary BSS changes, the second change count value no longer increases. It should be noted that an increasing manner of the first change count value is the same as that of the second change count value.

This embodiment of the present application is described by assuming that the BSS parameter change indication information is a token number. The AP and the STA each have one token number, the token number of the AP is the first change count value, and the token number of the STA is the second change count value.

The token number of the AP increments by 1 (1 is only an example herein, and 2 or another number may also be used) each time the critical parameter of the primary BSS to which the primary transceiver belongs changes. For example, if a primary channel number of the primary BSS to which the primary transceiver belongs changes, the token number of the AP increments by 1. It should be noted that if a same critical parameter changes twice, the token number increases twice.

The AP may periodically broadcast the token number, or sends a unicast frame to notify a single STA of the token number. For example, the token number is carried in a beacon frame (beacon) or an association response frame. When the primary transceiver of the STA is in the awake state, after receiving the token number, the STA stores the token number, or replaces a previously stored token number. In this way, when the primary transceiver of the STA is in the awake state, the token number of the AP and the token number of the STA are the same. After the primary transceiver of the STA changes from the awake state to the sleep state, the token number of the STA no longer changes. If the critical parameter of the primary BSS to which the primary transceiver of the STA belongs changes when the primary transceiver of the STA is in the sleep state, the token number of the AP may be different from the token number of the STA.

When the AP needs to wake up the STA, the AP adds the token number of the AP to the wake-up packet, and sends the wake-up packet to a wake-up receiver of the STA; or the AP adds the token number of the AP to a frame such as a wake-up beacon frame, and sends, in a broadcast manner, the wake-up beacon frame to a sleeping STA that is equipped with a wake-up receiver.

The wake-up beacon frame has a structure similar to that of an 802.11 beacon frame, and is formed by connecting elements in series. However, in addition to being periodically broadcast like the 802.11 frame, the wake-up beacon frame also includes a corresponding parameter of wake-up radio.

After receiving the token number of the AP, the STA compares the token number of the AP with a locally stored token number (the token number that is locally stored by the STA represents a quantity of change times of the critical parameter of the primary BSS of the primary transceiver of the STA belongs in a historical awake state of the STA). If the token numbers are the same, it indicates that the critical parameter of the primary BSS to which the primary transceiver belongs does not change; or if the token numbers are different, it indicates that the critical parameter of the primary BSS to which the primary transceiver belongs changes.

That the critical parameter of the primary BSS changes may be one or more of the following:

1. A channel of the primary BSS changes, for example, a primary channel number, a frequency band number, a bandwidth central frequency, and a secondary channel offset value.

2. An EDCA (enhanced distributed channel access) parameter of the primary BSS changes.

After the primary transceiver of the STA is woken up (the primary transceiver may be woken up by using the wake-up packet sent by the AP, or may be automatically woken up based on a time that is agreed on with the AP in advance). If the critical parameter of the primary BSS to which the primary transceiver belongs changes, a probe request (probe request frame) is sent to the AP, to request the AP to return a latest critical parameter of the primary BSS. After receiving the probe request frame of the STA, the AP returns a probe response frame, where the probe response frame includes the latest critical parameter of the primary BSS.

It should be noted that the foregoing latest critical parameter may be latest values of all critical parameters of the primary BSS; or the foregoing latest critical parameter may be a value of a critical parameter that changes and that is in all critical parameters of the primary BSS, and does not include a critical parameter that does not change. If the latest critical parameter is a value of a critical parameter that changes and that is in all the critical parameters of the primary BSS, when the STA requests the latest critical parameter from the AP, the STA may report the token number of the STA to the AP, so that the AP determines which critical parameter changes, and delivers, to the STA, a value of the critical parameter that changes.

Figure 7:
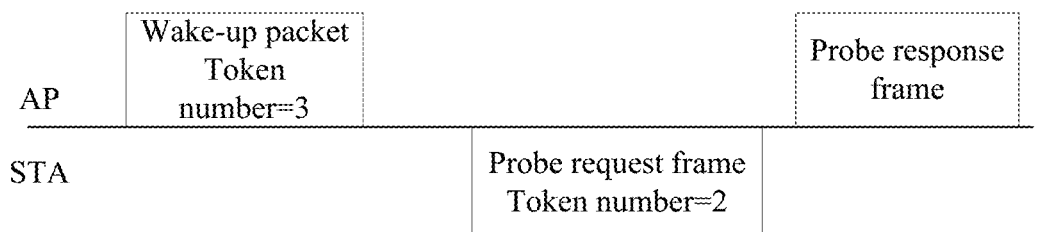
FIG. 7 is a schematic diagram of another station waking-up process according to an embodiment of the present application.

The foregoing specific process may be shown in FIG. 7. For example, the AP sends a wake-up packet to the STA, where the wake-up packet includes a token number 3 of the AP; the STA compares a token number 2 of the STA with the token number of the AP, and finds that they are different; and therefore the STA adds the token number 2 of the STA to a probe request frame and feeds back the probe request frame to the AP.

It is understandable that, if the token number of the STA is the same as the token number of the AP, the primary transceiver of the STA sends a PS-Poll frame or an Ack frame to the AP after waking up, or waits for the AP to send data to the STA. A specific process is shown in FIG. 6, and details are not described herein again. In another implementation, the STA has a wake-up radio transmit end, and the wake-up radio transmit end immediately sends an acknowledgement frame in response to the wake-up packet, that is, sends the acknowledgement frame after a short inter-frame space (SIFS for short) time interval after receiving the wake-up packet. Then, the AP sends data to the station after the primary transceiver of the station is woken up.

In another optional implementation, the BSS parameter indication information includes the BSS parameter change indication information, the BSS parameter change indication information includes a change identifier, and the change identifier is used to indicate whether the critical parameter of the primary BSS changes when the STA is in the sleep state.

That the primary transceiver of the STA communicates with the AP based on the BSS parameter indication information includes the following step 1 to step 3.

Step 1: The STA reads a value of the change identifier in the wake-up packet.

Step 2: If the value of the change identifier is a first preset value, the critical parameter of the primary BSS changes, where the first preset value is used to indicate that the critical parameter of the primary BSS changes.

Step 3: When the primary transceiver of the STA changes from the sleep state to an awake state, the primary transceiver of the STA obtains a latest critical parameter of the primary BSS, and communicates with the AP based on the latest critical parameter.

In an embodiment, the BSS parameter indication information carried in the wake-up packet includes the BSS parameter change indication information, the BSS parameter change indication information includes a change identifier, and the change identifier is used to indicate whether the critical parameter of the primary BSS to which the primary transceiver of the STA belongs changes when the STA is in the sleep state. For example, the change identifier may be a change bit, where "1" indicates that the critical parameter of the primary BSS to which the primary transceiver of the STA belongs changes when the primary transceiver of the STA is in the sleep state, and "0" indicates that the critical parameter of the primary BSS to which the primary transceiver of the STA belongs does not change when the primary transceiver of the STA is in the sleep state.

Optionally, the AP sends the wake-up packet to the STA, where the wake-up packet carries a change bit (that is, a change identifier), and the change bit is used to notify the STA that needs to be woken up whether the critical parameter of the primary BSS to which the primary transceiver of the STA belongs changes. It should be noted that the AP needs to record a time at which each STA associated with the AP enters a sleep state. In this way, the AP can accurately determine whether the critical parameter of the primary BSS to which the primary transceiver of the STA belongs changes when the primary transceiver of the STA is in the sleep state.

Optionally, the wake-up packet that includes the change bit may alternatively be a wake-up beacon frame. In other words, the AP periodically broadcasts the wake-up beacon frame to notify a STA around the AP. For example, when the critical parameter of the primary BSS changes, the AP broadcasts a wake-up beacon frame once, where the wake-up beacon frame carries a change bit used to indicate that the critical parameter of the primary BSS changes.

If the change bit indicates that the critical parameter of the primary BSS to which the primary transceiver of the STA belongs changes, the STA sends a probe request frame to the AP after waking up, and then the AP returns a probe response frame to the STA. If the change bit indicates that the critical parameter of the primary BSS to which the primary transceiver of the STA belongs does not change, the STA sends a PS-Poll frame or an Ack frame to the AP, or waits for the AP to send data to the STA. A specific process is shown in FIG. 6, and details are not described herein again.

In addition, the BSS parameter indication information carried in the wake-up packet includes the BSS parameter change indication information, and the BSS parameter change indication information includes a latest value of a critical parameter that changes and that is in the critical parameter of the primary BSS to which the primary transceiver of the STA belongs. In other words, the latest value is used to indicate that the critical parameter of the primary BSS changes when the primary transceiver of the STA is in the sleep state.

Specifically, optionally, the AP sends the wake-up packet to the STA, where the wake-up packet carries a latest value of a critical parameter that changes. It should be noted that the AP needs to record a time at which each STA associated with the AP enters a sleep state. In this way, the AP can accurately determine which critical parameter of the primary BSS to which the primary transceiver of the STA belongs changes when the primary transceiver of the STA is in the sleep state.

Optionally, the wake-up packet that includes the latest value of the critical parameter that changes may alternatively be a wake-up beacon frame. In other words, the AP periodically broadcasts the wake-up beacon frame to notify a STA around the AP. For example, when the critical parameter of the primary BSS changes, the AP broadcasts a wake-up beacon frame once, where the wake-up beacon frame carries a latest value of the critical parameter that changes.

After the STA changes from the sleep state to the awake state, the STA communicates with the AP by using the latest value.

Optionally, the critical parameter that changes may include a beacon frame parameter, and the beacon frame parameter includes at least one of an arrival time of a next beacon frame and a beacon frame interval.

Specifically, a beacon frame carries some important parameters of the primary BSS. The AP usually periodically sends a beacon frame. If a beacon frame parameter of the primary BSS to which the primary transceiver belongs changes, the wake-up packet may include a latest value of the beacon frame parameter, where the beacon frame parameter may include at least one of an arrival time of a beacon frame and a beacon frame interval. The AP notifies the STA of the latest value of the beacon frame parameter, so that the primary transceiver of the STA receives the beacon frame at a correct time point after waking up.

Figure 8:
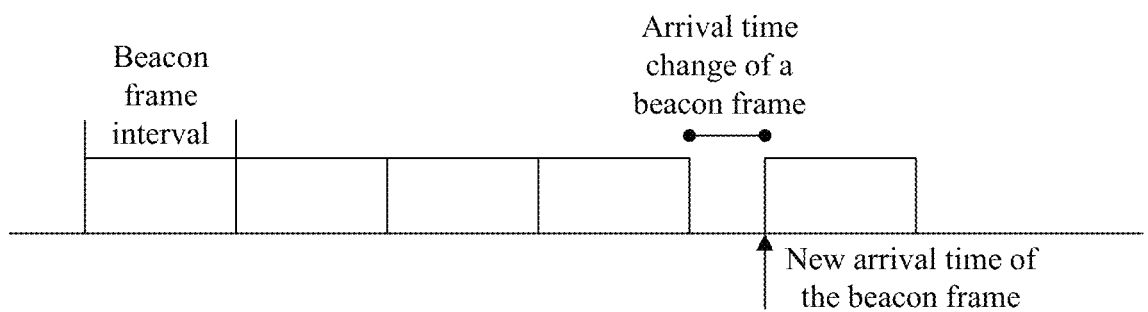
FIG. 8 is a schematic diagram of an arrival time of a beacon frame according to an embodiment of the present application.

Optionally, the arrival time of the next beacon frame may be a specific time, or may be a beacon time offset value, where the offset value is a difference between a real arrival time of the next beacon frame and an originally agreed arrival time of the next beacon frame. As shown in FIG. 8, a time change is the beacon time offset value.

Figure 9:
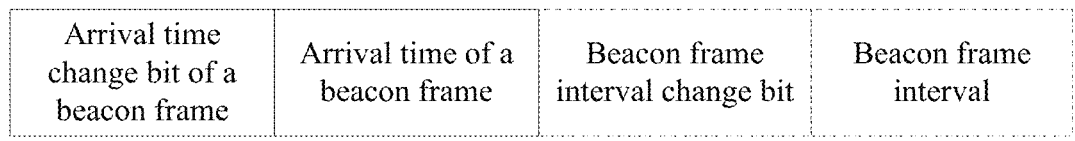
FIG. 9 is a schematic structural diagram of a beacon frame indication according to an embodiment of the present application.

In an optional implementation, the wake-up packet includes an arrival time change bit of a beacon frame. As shown in FIG. 9, if the arrival time change bit of the beacon frame indicates that an arrival time of the beacon frame changes, the wake-up packet includes an arrival time of a next beacon frame. In another manner, the wake-up packet always includes both an arrival time change bit of a beacon frame and an arrival time of a next beacon frame.

Optionally, the wake-up packet further includes a beacon frame interval change bit. If the beacon frame interval change bit indicates that a beacon frame interval changes, the wake-up packet further includes a new beacon frame interval. In another manner, the wake-up packet always includes both a beacon frame interval change bit and a beacon frame interval.

The foregoing beacon frame parameter may not only be included in the wake-up packet sent to the station, but also be included in a wake-up packet, such as a wake-up beacon frame, that is broadcast to all stations or that is sent to one or more groups of stations in a multicast manner.

Optionally, the critical parameter that changes may include a channel parameter of the primary BSS.

The channel parameter of the primary BSS includes at least one of a channel number, a secondary channel offset indication, a channel bandwidth, a channel central frequency, and a frequency band number of the primary BSS.

Specifically, when the channel parameter of the primary BSS to which the primary transceiver of the STA belongs changes, and the AP sends a wake-up packet to the sleeping STA (the wake-up receiver is in an on state, and the primary transceiver is in the sleep state), the wake-up packet includes at least one of a channel number, a secondary channel offset indication, a channel bandwidth, a channel central frequency (including a channel central frequency 1 and a channel central frequency 2), and a frequency band number of the primary BSS, so as to instruct the primary transceiver of the STA that is woken up to communicate with the AP on a correct channel.

The channel parameter may not only be included in the wake-up packet sent to the STA, but also be included in a wake-up packet, such as a wake-up beacon frame, that is broadcast to all STAs or that is sent to one or more groups of STAs in a multicast manner.

The channel number may be a primary channel number, and the secondary channel offset indication indicates whether a frequency of a secondary channel is lower than or higher than a frequency (or a reference number) of a primary channel.

An indication of the channel bandwidth is shown in the following table:

| Sequence number | Bandwidth |
| --- | --- |
| 0 | 20 or 40 MHz |
| 1 | 80, 160, 80 + 80 MHz |
| 2 | 160 MHz |
| 3 | 80 + 80 MHz |

An indication of the channel central frequency is shown in the following table:

| | |
| --- | --- |
| Channel central frequency 1 | 1. When a channel bandwidth sequence number is 1 and a bandwidth is 80 MHz, the channel central frequency 1 indicates a central frequency of an 80 MHz channel.<br>2. When a channel bandwidth sequence number is 1 and a bandwidth is 160 MHz, the channel central frequency 1 indicates a central frequency of a primary 80 MHz channel.<br>3. When a channel bandwidth sequence number is 1 and a bandwidth is 80 + 80 MHz, or a channel bandwidth sequence number is 3 (where a channel bandwidth is 80 + 80 MHz), the channel central frequency 1 indicates a central frequency of a primary 80 MHz channel.<br>4. When a channel bandwidth sequence number is 2 (160 MHz), the channel central frequency 1 indicates a central frequency of a 160 MHz channel. |
| Channel central frequency 2 | 1. When a channel bandwidth sequence number is 0 (20 MHz or 40 MHz), or a channel bandwidth sequence number is 1 and a bandwidth is 80 MHz, the channel central frequency 2 is a reserved bit.<br>2. When a channel bandwidth sequence number is 1 and a bandwidth is 160 MHz, the channel central frequency 2 indicates a central frequency of a 160 MHz channel.<br>3. When a channel bandwidth sequence number is 1 and a bandwidth is 80 + 80 MHz, or a channel bandwidth sequence number is 3 (where a channel bandwidth is 80 + 80 MHz), the channel central frequency 2 indicates a central frequency of a secondary 80 MHz channel.<br>4. When a channel bandwidth sequence number is 2 (160 MHz), the channel central frequency 2 is a reserved bit. |

An indication of the frequency band number is shown in the following table:

| Frequency band number | Meaning |
| --- | --- |
| 0 | Below 1 GHz |
| 1 | 2.4 GHz |
| 2 | 4.9 GHz and 5 GHz |
| Others | Reserved |

Optionally, the critical parameter that changes may further include an enhanced distributed channel access (EDCA) parameter of a contention channel of the primary BSS.

The EDCA parameter of the primary BSS includes at least one of quality of service QoS information, an access category best effort traffic (AC_BE) parameter, an access category background traffic (AC_BK) parameter, an access category video traffic (AC_VI) parameter, and an access category voice traffic (AC_VO) parameter of the contention channel of the primary BSS, or at least one of a subparameter set thereof.

Figure 10:
FIG. 10 is a schematic diagram of an EDCA parameter according to an embodiment of the present application.

Specifically, when the EDCA parameter of the contention channel of the primary BSS to which the primary transceiver of the STA belongs changes, and the AP sends a wake-up packet to the sleeping STA (the wake-up receiver is in an on state, and the primary transceiver is in the sleep state), as shown in FIG. 10, the wake-up packet includes a QoS Info field, an AC_BE (best effort traffic, Best effort) parameter, an AC_BK (background traffic, background) parameter, an AC_VI (video traffic, video) parameter, an AC_VO (voice traffic, voice) parameter, and the like. AC indicates an access category. An access traffic of each category further includes an arbitration interframe spacing number (AIFSN), an exponent form of CWmin (ECWmin), an exponent form of CWmax (ECWmax), and a transmission opportunity limit (TXOPLimit).

The EDCA parameter may not only be included in a wake-up packet sent to the STA, but also be included in a wake-up packet, such as a wake-up beacon frame, that is broadcast to all STAs or that is sent to one or more groups of STAs in a multicast manner.

In still another implementation, the BSS parameter indication information includes the target parameter of the primary BSS to which the primary transceiver of the STA currently belongs, and the target parameter includes a beacon frame parameter.

The beacon frame parameter includes at least one of an arrival time of a next beacon frame and a beacon frame interval.

In still another implementation, the BSS parameter indication information includes the target parameter of the primary BSS to which the primary transceiver of the STA currently belongs, and the target parameter includes a channel parameter of the primary BSS.

The channel parameter of the primary BSS includes at least one of a channel number, a secondary channel offset indication, a channel bandwidth, a channel central frequency, and a frequency band number of the primary BSS.

In still another implementation, the BSS parameter indication information includes the target parameter of the primary BSS to which the primary transceiver of the STA currently belongs, and the target parameter includes an enhanced distributed channel access (EDCA) parameter of a contention channel of the primary BSS.

The EDCA parameter of the primary BSS includes at least one of quality of service QoS information, an access category best effort traffic (AC_BE) parameter, an access category background traffic (AC_BK) parameter, an access category video traffic (AC_VI) parameter, and an access category voice traffic (AC_VO) parameter of the contention channel of the primary BSS, or at least one of a sub-parameter set thereof.

In a specific embodiment, the BSS parameter indication information sent to the STA by the AP may include the target parameter of the primary BSS to which the primary transceiver of the STA currently belongs. The target parameter may be a preset critical parameter, for example, at least one critical parameter that is determined based on an empirical value and that may change. Each time the AP sends a wake-up packet to the STA, the wake-up packet includes the current target parameter of the primary BSS. During sleep time of the STA, the target parameter may change, or may not change. However, to ensure that the STA can successfully communicate with the AP, the target parameter is sent to the STA. After the STA changes from the sleep state to the awake state, the STA communicates with the AP by using the target parameter. In this way, the AP delivers a same type of target parameter to each STA, so that the AP does not need to record a sleep time of each STA.

In this embodiment of the present application, the STA receives the wake-up packet sent by the AP, where the wake-up packet includes the BSS parameter indication information, the BSS parameter indication information includes the BSS parameter change indication information or the target parameter of the primary BSS to which the primary transceiver of the STA currently belongs, and the BSS parameter change indication information is used to indicate whether the critical parameter of the primary BSS changes when the primary transceiver of the STA is in the sleep state; and the primary transceiver of the STA communicates with the AP based on the BSS parameter indication information. In this manner, the BSS parameter indication information is sent to the STA by using the wake-up packet, so that the STA can accurately learn of a current critical parameter of the primary BSS, thereby effectively ensuring that the primary transceiver of the STA successfully communicates with the AP after waking up.

FIG. 11 is a schematic flowchart of another data communication method according to an embodiment of the present application. This embodiment of the present application is described by using a first network node as an example. The first network node may be an AP or a STA. If the first network node is an AP, a second network node is a STA; or if the first network node is a STA, a second network node is an AP. As shown in FIG. 11, the data communication method in this embodiment of the present application includes steps S200 and S201.

S200. The first network node receives a wake-up packet sent by the second network node, where the wake-up packet includes a target parameter value, the target parameter value is an updated value of a communications parameter between the first network node and the second network node, and the communications parameter includes at least one parameter in a target wake up time (TWT) element related to a primary transceiver of a station and/or a transmission operation mode parameter of the second network node.

S201. The first network node communicates with the second network node based on the target parameter value.

In an embodiment, the first network node is equipped with a wake-up receiver, and the second network node sends the wake-up packet to the first network node to wake up the first network node. After being woken up, the first network node communicates with the second network node. It should be noted that a process of waking up the first network node and a process of communicating with the second network node are usually performed based on the communications parameter. However, when the first network node is in a sleep state, a parameter value of the communications parameter may usually change, for example, may change based on a network status. When the communications parameter changes, the second network node needs to notify the first network node by using the wake-up packet.

The communications parameter in this embodiment of the present application includes the at least one parameter in the target wake up time (TWT) element and/or the transmission operation mode parameter of the second network node. TWT is a mechanism in which the AP and the primary transceiver of the STA agree on a waking time. The STA may be in the sleep state in a time period other than a waking time period, to reduce power consumption.

This embodiment is described below by assuming that the first network node is a STA, the second network node is an AP, and the STA is equipped with a wake-up receiver. Certainly, alternatively, the first network node may be an AP, the second network node is a STA, and the AP is equipped with a wake-up receiver.

When at least one parameter in the TWT element that is previously negotiated between the AP and the primary transceiver of the STA changes, or a new TWT needs to be established between the AP and the primary transceiver of the STA, the AP sends a wake-up packet to the STA that is in the sleep state. In this case, the wake-up receiver of the STA is in an on state, the primary transceiver of the STA is in the sleep state, and the wake-up packet includes a target parameter value that is the at least one updated parameter in the TWT element between the AP and the STA.

FIG. 12 is a schematic structural diagram of a TWT element according to an embodiment of the present application. As shown in FIG. 12, the TWT element includes a control field, a request type field, a target wake up time field, a TWT group assignment field, a minimum TWT wake duration field, a TWT wake interval mantissa field, a TWT channel field, and a null data packet (NDP) paging field.

The request type includes a TWT request field, a TWT establishment command, a trigger indication, an implicit indication, a traffic type, a TWT traffic indication, a TWT wake interval exponent, a TWT protection bit, and the like. TWT wake interval=TWT wake interval mantissa* $2^{(TWT\ wake\ interval\ exponent)}$.

In an optional implementation, if the communications parameter includes the target wake up time in the TWT element, that the first network node communicates with the second network node based on the target parameter value includes:

adjusting, by the first network node based on the target parameter value, a target awake time point at which a primary transceiver of the first network node performs communication with the second network node, and communicating with the second network node.

In a specific embodiment, the AP and the STA agree on a target wake-up time in advance. If the STA does not receive notification information about update of the target wake-up time, the STA wakes up at the pre-agreed target wake-up time, and communicates with the AP. However, when the AP cannot communicate with the STA at the pre-agreed target wake-up time because of a network status change or another reason, if the STA still wakes up at the originally pre-agreed target wake-up time and then communicates with the AP, a communication failure occurs. In this embodiment of the present application, the AP notifies, by using the wake-up packet, the STA that the target wake-up time is updated to the target parameter value, thereby effectively ensuring successful communication between the AP and the STA.

For example, if the AP expects to postpone one originally agreed target wake-up time for the primary transceiver of the STA, the wake-up packet sent by the AP includes that the target wake-up time is updated to a postponed target wake-up time. In this way, the primary transceiver of the STA does not wake up based on the originally agreed target wake-up time. It should be noted that an extra target wake-up time may be added in a similar way.

In another optional implementation, if the communications parameter includes the minimum TWT wake duration in the TWT element, that the first network node communicates with the second network node based on the target parameter value includes:

adjusting, by the first network node based on the target parameter value, minimum awake duration during which a primary transceiver of the first network node performs communication with the second network node, and communicating with the second network node.

In a specific embodiment, communication duration between the AP and the primary transceiver of the STA may be adjusted by adjusting the minimum TWT wake duration in the TWT element. For example, if the AP expects to perform, at the pre-agreed target wake-up time or the updated target wake-up time, longer-time communication with the primary transceiver of the STA that is awake, the AP changes the minimum TWT wake duration in the TWT element by using the wake-up packet. After receiving the wake-up packet, the STA obtains the minimum TWT wake duration through parsing. The STA can learn of, based on the minimum TWT wake duration, duration of communication with the AP after waking up.

In still another optional implementation, if the communications parameter includes the TWT wake interval mantissa and the TWT wake interval exponent in the TWT element, that the first network node communicates with the second network node based on the target parameter value includes:

adjusting, by the first network node based on the target parameter value, an awake period interval at which a primary transceiver of the first network node performs communication with the second network node, and communicating with the second network node.

In a specific embodiment, the awake period interval of the primary transceiver of the STA may be adjusted by changing the TWT wake interval mantissa and the TWT wake interval exponent in the TWT element. For example, if a duty cycle changes, the AP may change a TWT wake interval in the TWT element by using the wake-up packet, that is, change the TWT wake interval by using the TWT wake interval mantissa and the TWT wake interval exponent in the TWT element. It should be noted that the TWT wake interval exponent is in the request type field in FIG. 12.

In still another optional implementation, the wake-up packet includes a TWT parameter overloading field, and the TWT parameter overloading field includes a parameter overloading bit, which may be one bit or several bits.

When the parameter overloading bit indicates TWT parameter overloading, the TWT parameter overloading field includes the target parameter value that is the at least one updated parameter in the TWT element.

That the first network node communicates with the second network node based on the target parameter value includes:

adjusting, by the first network node based on the target parameter value, a parameter for a primary transceiver of the first network node to perform communication with the second network node, and communicating with the second network node.

In a specific embodiment, the wake-up packet may further include the TWT parameter overloading field, the TWT parameter overloading field includes a TWT parameter overloading bit, a trigger indication, a traffic type, a TWT traffic indication, a TWT wake interval exponent, a target wake time, minimum TWT wake duration, and a TWT wake interval mantissa. When the TWT parameter overloading bit is set to "TWT parameter overloading", the trigger indication, the traffic type, the TWT traffic indication, the TWT wake interval exponent, the target wake time, the minimum TWT wake duration, and the TWT wake interval mantissa are overloaded target parameter values; or when the TWT parameter overloading bit is not set to "TWT parameter overloading", these parameters are reserved bits.

Further, optionally, the wake-up packet may further include canceling an originally established TWT field. If the canceling an originally established TWT field is set to "cancellation", the originally established between the AP and the primary transceiver of the STA is invalid; or if the canceling an originally established TWT field is not set to "cancellation", the originally established between the AP and the primary transceiver of the STA is retained.

If the originally established TWT field is canceled, the wake-up packet includes a new TWT parameter established between the primary transceiver of the STA and the AP, and the AP adjusts, based on a new network status, the new TWT parameter established between the AP and the STA, to further reduce power consumption of the STA, meet a service requirement of the STA, and balance network load.

In still another optional implementation, if the communications parameter includes the transmission operation mode parameter of the second network node, the transmission operation mode parameter of the second network node includes a maximum quantity of transmittable streams and transmit power information.

The transmit power information is a maximum transmit power of the second network node or transmit power fluctuation indication information of the second network node, where the transmit power fluctuation indication information is used to indicate whether transmit power fluctuation is allowed during data transmission of the second network node.

In a specific embodiment, during sleep time of the primary transceiver of the STA, a transmission operation mode parameter for the AP to send data to the primary transceiver of the STA may change, such as a maximum quantity of transmittable streams and transmit power information. The transmit power information may be a specific maximum transmit power, or may be a transmit power fluctuation bit indication. For example, a transmit power fluctuation bit indication "1" represents that transmit power fluctuation is allowed during data transmission of the AP, and a transmit power fluctuation bit indication "0" represents that the AP sends data at a same transmit power.

The transmit power fluctuation bit indication is used to notify the STA that is woken up whether receiver sensitivity of the primary transceiver of the STA needs to be adjusted after the STA wakes up. When the transmit power fluctuation bit indication indicates that a transmit power fluctuates, the STA that is woken up needs to adjust the receiver sensitivity of the primary transceiver of the STA, or when the transmit power fluctuation bit indication indicates that a transmit power does not fluctuate, the STA that is woken up does not need to adjust the receiver sensitivity of the primary transceiver of the STA.

Optionally, when the AP sends a wake-up packet to the sleeping STA (the wake-up receiver of the STA is in an on state, and the primary transceiver is in the sleep state), the wake-up packet includes a transmission operation mode field, including a maximum quantity of transmittable streams, transmit power information, and the like.

In this embodiment, the AP sends the wake-up packet to the STA, to notify the STA that is woken up of a transmission operation mode change of the AP associated with the STA, to ensure that STA performs reception in an optimal manner, thereby reducing power consumption. Certainly, alternatively, the STA may send a wake-up packet to the AP (a wake-up receiver of the AP is in an on state, and the primary transceiver is in the sleep state), to notify the AP that is woken up of a transmission operation mode change of the STA, to ensure that the AP performs reception in an optimal manner, thereby reducing power consumption.

In this embodiment of the present application, the first network node receives the wake-up packet sent by the second network node, where the wake-up packet includes the target parameter value, the target parameter value is the updated value of the communications parameter between the first network node and the second network node, and the communications parameter includes the at least one parameter in the target wake up time TWT element and/or the transmission operation mode parameter of the second network node; and the first network node communicates with the second network node based on the target parameter value. In this manner, the first network node may be notified of an updated communications parameter between the first network node and the second network node in a timely manner, ensuring that the first network node successfully communicates with the second network node.

It should be noted that the foregoing implementation in which the second network node notifies, by using the wake-up packet, the first network node of the TWT parameter established between the second network node and the primary transceiver of the first network node or the transmission operation mode parameter of the second network node may be directly extended as: the second network node notifies, by using an 802.11 frame (also referred to as an 802.11 packet), the first network node of the TWT parameter established between the second network node and a wake-up receiver of the first network node or the transmission operation mode parameter of the second network node. In addition, the primary transceiver of the first network node uses the 802.11 frame, such as a management frame, to notify the second network node of a latest working duty cycle parameter of the wake-up receiver of the first network node, to help the wake-up receiver of the first network node correctly receive the wake-up packet of the second network node during sleep time of the primary transceiver of the first network node.

An embodiment of this application further provides a data communication apparatus. The apparatus may be the STA described in the method of FIG. 5, or may be another device that can implement an action of the STA in the method of FIG. 5.

Figure 13B:
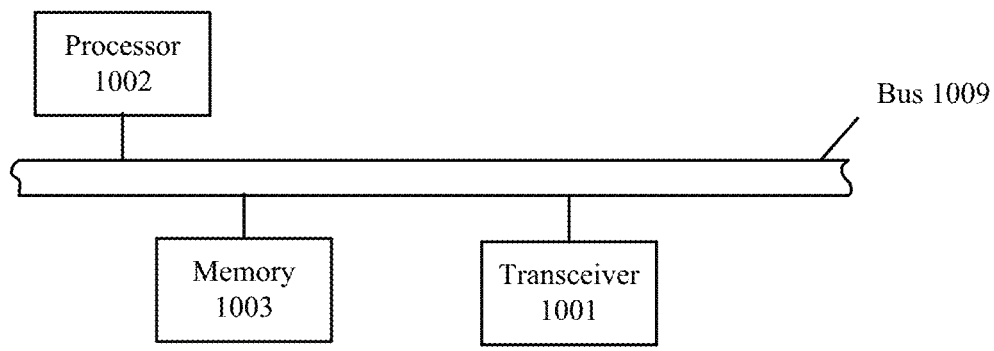
FIG. 13b is a schematic structural diagram of another data communication apparatus according to an embodiment of the present application.

FIG. 13a and FIG. 13b each are a schematic structural diagram of a data communication apparatus according to an embodiment of the present application. As shown in FIG. 13a, the data communication apparatus may include a receiving unit 100 and a communications unit 101.

The receiving unit 100 is configured to receive a wake-up packet sent by an access point AP, where the wake-up packet includes basic service set BSS parameter indication information, the BSS parameter indication information includes BSS parameter change indication information or a target parameter of a primary BSS to which a primary transceiver of a STA currently belongs, and the BSS parameter change indication information is used to indicate whether a critical parameter of the primary BSS changes when the primary transceiver of the STA is in a sleep state.

The communications unit 101 is configured to communicate with the AP based on the BSS parameter indication information.

Optionally, the wake-up packet is sent to the STA by the AP in a unicast manner; or
the wake-up packet is sent to the STA by the AP in a broadcast manner or in a multicast manner.

The BSS parameter indication information includes the BSS parameter change indication information, the BSS parameter change indication information includes a first change count value counted by the AP, and the first change count value is used to represent a quantity of change times of the critical parameter of the primary BSS.

That the communications unit 101 communicates with the AP based on the BSS parameter indication information specifically includes:
detecting whether a second change count value maintained by the STA is the same as the first change count value, where the second change count value is used to represent a quantity of change times of the critical parameter of the primary BSS when the primary transceiver of the STA is in a historical awake state;
if the second change count value is different from the first change count value, the critical parameter of the primary BSS changes when the primary transceiver of the STA is in the sleep state; and
when the primary transceiver of the STA changes from the sleep state to an awake state, obtaining a latest critical parameter of the primary BSS, and communicating with the AP based on the latest critical parameter.

The BSS parameter indication information includes the BSS parameter change indication information, the BSS parameter change indication information includes a change identifier, and the change identifier is used to indicate whether the critical parameter of the primary BSS changes when the STA is in the sleep state.

That the communications unit 101 communicates with the AP based on the BSS parameter indication information specifically includes:
reading a value of the change identifier in the wake-up packet;
if the value of the change identifier is a first preset value, the critical parameter of the primary BSS changes, where the first preset value is used to indicate that the critical parameter of the primary BSS changes; and
when the primary transceiver of the STA changes from the sleep state to an awake state, obtaining a latest critical parameter of the primary BSS, and communicating with the AP based on the latest critical parameter.

In addition, the BSS parameter indication information carried in the wake-up packet includes the BSS parameter change indication information, and the BSS parameter change indication information includes a latest value of a critical parameter that changes and that is in the critical parameter of the primary BSS to which the primary transceiver of the STA belongs. In other words, the latest value is used to indicate that the critical parameter of the primary BSS changes when the primary transceiver of the STA is in the sleep state.

Specifically, optionally, that the communications unit 101 obtains a latest critical parameter of the primary BSS specifically includes:

sending a probe request frame to the AP, where the probe request frame is used to request the latest critical parameter of the primary BSS; and receiving a probe response frame returned by the AP, where the probe response frame carries the latest critical parameter of the primary BSS.

The BSS parameter indication information includes the target parameter of the primary BSS to which the primary transceiver of the STA currently belongs, and the target parameter includes a beacon frame parameter.

The beacon frame parameter includes at least one of an arrival time of a next beacon frame and a beacon frame interval.

The BSS parameter indication information includes the target parameter of the primary BSS to which the primary transceiver of the STA currently belongs, and the target parameter includes a channel parameter of the primary BSS; and The channel parameter of the primary BSS includes at least one of a channel number, a secondary channel offset indication, a channel bandwidth, a channel central frequency, and a frequency band number of the primary BSS.

The BSS parameter indication information includes the target parameter of the primary BSS to which the primary transceiver of the STA currently belongs, and the target parameter includes an enhanced distributed channel access EDCA parameter of a contention channel of the primary BSS.

The EDCA parameter of the primary BSS includes at least one of quality of service QoS information, an access category best effort traffic AC_BE parameter, an access category background traffic AC_BK parameter, an access category video traffic AC_VI parameter, and an access category voice traffic AC_VO parameter of the contention channel of the primary BSS.

Correspondingly, as shown in FIG. 13b, the apparatus may include a transceiver 1001 and a processor 1002. The processor 1002 is configured to control an operation of the apparatus, including performing data transmission (including reception and/or transmission) by using the transceiver 1001. Further, the apparatus may further include a memory 1003, where the memory 1003 may include a read-only memory and a random access memory, and is configured to provide the processor 1002 with an instruction and data. The memory 1003 may be integrated into the processor 1002, or may be independent of the processor 1002. A part of the memory 1003 may further include a non-volatile random access memory (NVRAM). Components of the apparatus are coupled together by using a bus system. In addition to a data bus, the bus system 1009 further includes a power bus, a control bus, and a status signal bus. However, for clear description, various types of buses in the figure are marked as the bus system 1009.

The process disclosed in the embodiment of this application in FIG. 5 may be applied to the processor 1002, or may be implemented by the processor 1002. In an implementation process, steps in the process implemented by the apparatus can be implemented by an integrated logic circuit of hardware in the processor 1002 or by an instruction in a software form. The processor 1002 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiment of this application in FIG. 5 may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1003, and the processor 1002 reads information in the memory 1003 and completes the steps in the process described in the embodiments of the present application in combination with hardware of the processor 1002.

Further, when the apparatus is a user equipment STA, the apparatus may further include an input device, such as a keyboard, and an output device, such as a structure of a display, and details are not described herein.

The transceiver 1001 is configured to receive a wake-up packet sent by an access point AP, where the wake-up packet includes basic service set BSS parameter indication information, the BSS parameter indication information includes BSS parameter change indication information or a target parameter of a primary BSS to which a primary transceiver of the STA currently belongs, and the BSS parameter change indication information is used to indicate whether a critical parameter of the primary BSS changes when the primary transceiver of the STA is in a sleep state.

The transceiver 1001 is further configured to communicate with the AP based on the BSS parameter indication information.

Optionally, the wake-up packet is sent to the STA by the AP in a unicast manner; or the wake-up packet is sent to the STA by the AP in a broadcast manner or in a multicast manner.

Optionally, the BSS parameter indication information includes the BSS parameter change indication information, the BSS parameter change indication information includes a first change count value counted by the AP, and the first change count value is used to represent a quantity of change times of the critical parameter of the primary BSS.

The processor 1002 is configured to detect whether a second change count value maintained by the STA is the same as the first change count value, where the second change count value is used to represent a quantity of change times of the critical parameter of the primary BSS when the primary transceiver of the STA is in a historical awake state; and if the second change count value is different from the first change count value, the critical parameter of the primary BSS changes when the primary transceiver of the STA is in the sleep state.

The transceiver 1001 is further configured to: when the primary transceiver of the STA changes from the sleep state to an awake state, obtain a latest critical parameter of the primary BSS, and communicate with the AP based on the latest critical parameter.

Optionally, the BSS parameter indication information includes the BSS parameter change indication information, the BSS parameter change indication information includes a change identifier, and the change identifier is used to indicate whether the critical parameter of the primary BSS changes when the STA is in the sleep state.

The processor 1002 is further configured to read a value of the change identifier in the wake-up packet; and if the value of the change identifier is a first preset value, the critical parameter of the primary BSS changes, where the first preset value is used to indicate that the critical parameter of the primary BSS changes.

The transceiver 1001 is further configured to: when the primary transceiver of the STA changes from the sleep state to an awake state, obtain a latest critical parameter of the primary BSS, and communicate with the AP based on the latest critical parameter.

In addition, the BSS parameter indication information carried in the wake-up packet includes the BSS parameter change indication information, and the BSS parameter change indication information includes a latest value of a critical parameter that changes and that is in the critical parameter of the primary BSS to which the primary transceiver of the STA belongs. In other words, the latest value is used to indicate that the critical parameter of the primary BSS changes when the primary transceiver of the STA is in the sleep state.

Further, optionally, the transceiver 1001 is further configured to send a probe request frame to the AP, where the probe request frame is used to request the latest critical parameter of the primary BSS.

The transceiver 1001 is further configured to receive a probe response frame returned by the AP, where the probe response frame carries the latest critical parameter of the primary BSS.

Optionally, the BSS parameter indication information includes the target parameter of the primary BSS to which the primary transceiver of the STA currently belongs, and the target parameter includes a beacon frame parameter.

The beacon frame parameter includes at least one of an arrival time of a next beacon frame and a beacon frame interval.

Optionally, the BSS parameter indication information includes the target parameter of the primary BSS to which the primary transceiver of the STA currently belongs, and the target parameter includes a channel parameter of the primary BSS.

The channel parameter of the primary BSS includes at least one of a channel number, a secondary channel offset indication, a channel bandwidth, a channel central frequency, and a frequency band number of the primary BSS.

Optionally, the BSS parameter indication information includes the target parameter of the primary BSS to which the primary transceiver of the STA currently belongs, and the target parameter includes an enhanced distributed channel access EDCA parameter of a contention channel of the primary BSS.

The EDCA parameter of the primary BSS includes at least one of quality of service QoS information, an access category best effort traffic AC_BE parameter, an access category background traffic AC_BK parameter, an access category video traffic AC_VI parameter, and an access category voice traffic AC_VO parameter of the contention channel of the primary BSS.

In this embodiment of the present application, the STA receives the wake-up packet sent by the AP, where the wake-up packet includes the BSS parameter indication information, the BSS parameter indication information includes the BSS parameter change indication information or the target parameter of the primary BSS to which the primary transceiver of the STA currently belongs, and the BSS parameter change indication information is used to indicate whether the critical parameter of the primary BSS changes when the primary transceiver of the STA is in the sleep state; and the primary transceiver of the STA communicates with the AP based on the BSS parameter indication information. In this manner, the BSS parameter indication information is sent to the STA by using the wake-up packet, so that the STA can accurately learn of a current critical parameter of the primary BSS, thereby effectively ensuring that the primary transceiver of the STA successfully communicates with the AP after waking up.

It is understandable that reference may be made to related descriptions about the method embodiment of FIG. 5 for a specific implementation of the components in the foregoing data communication apparatuses, and details are not described herein again.

An embodiment of this application further provides a data communication apparatus. The apparatus may be the first network node described in the foregoing method of FIG. 11, and the first network node may be a STA or an AP. If the first network node is a STA, a second network node in this embodiment of the present application is an AP; or if the first network node is an AP, a second network node in this embodiment of the present application is a STA. Certainly, the data communication apparatus in this embodiment of the present application may alternatively be another device that can implement an action of the first network node in the foregoing method of FIG. 11.

Figure 14A:
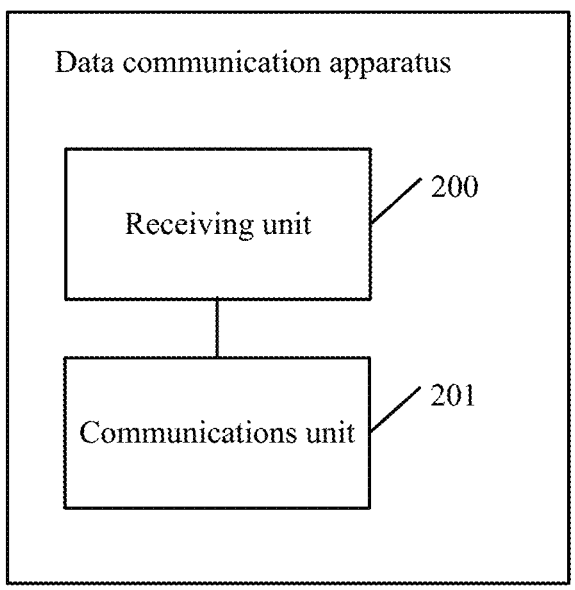
FIG. 14a is a schematic structural diagram of still another data communication apparatus according to an embodiment of the present application.
Figure 14B:
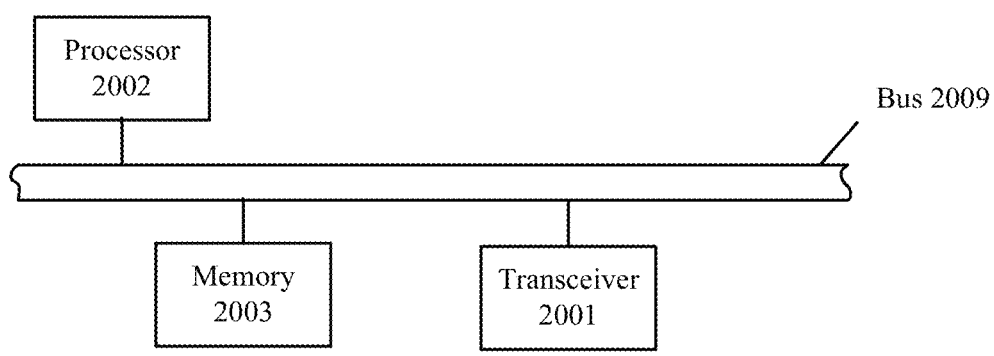
FIG. 14b is a schematic structural diagram of yet another data communication apparatus according to an embodiment of the present application.

FIG. 14*a* and FIG. 14*b* each are a schematic structural diagram of a data communication apparatus according to an embodiment of the present application. As shown in FIG. 14*a*, the data communication apparatus may include a receiving unit 200 and a communications unit 201.

The receiving unit 200 is configured to receive a wake-up packet sent by a second network node, where the wake-up packet includes a target parameter value, the target parameter value is an updated value of a communications parameter between the first network node and the second network node, and the communications parameter includes at least one parameter in a target wake-up time TWT element and/or a transmission operation mode parameter of the second network node.

The communications unit 201 is configured to communicate with the second network node based on the target parameter value.

Optionally, if the communications parameter includes a target wake-up time in the TWT element, that the communications unit 201 communicates with the second network node based on the target parameter value specifically includes:

adjusting, based on the target parameter value, a target awake time point at which a primary transceiver of the first network node performs communication with the second network node, and communicating with the second network node.

Optionally, if the communications parameter includes a minimum TWT wake duration in the TWT element, that the communications unit 201 communicates with the second network node based on the target parameter value specifically includes:

adjusting, based on the target parameter value, minimum awake duration during which a primary transceiver of the first network node performs communication with the second network node, and communicating with the second network node.

Optionally, if the communications parameter includes a TWT wake interval mantissa and a TWT wake interval exponent in the TWT element, that the communications unit 201 communicates with the second network node based on the target parameter value specifically includes:

adjusting, based on the target parameter value, an awake period interval at which a primary transceiver of the first network node performs communication with the second network node, and communicating with the second network node.

Optionally, the wake-up packet includes a TWT parameter overloading field, and the TWT parameter overloading field includes a parameter overloading bit.

When the parameter overloading bit indicates TWT parameter overloading, the TWT parameter overloading field includes the target parameter value that is the at least one updated parameter in the TWT element.

That the communications unit 201 communicates with the second network node based on the target parameter value specifically includes:

adjusting, based on the target parameter value, a parameter for a primary transceiver of the first network node to perform communication with the second network node, and communicating with the second network node.

Further, optionally, the transmission operation mode parameter of the second network node includes a maximum quantity of transmittable streams and transmit power information.

The transmit power information is a maximum transmit power of the second network node or transmit power fluctuation indication information of the second network node, where the transmit power fluctuation indication information is used to indicate whether transmit power fluctuation is allowed during data transmission of the second network node.

Correspondingly, as shown in FIG. 14b, the apparatus may include a transceiver 2001 and a processor 2002. The processor 2002 is configured to control an operation of the apparatus, including performing data transmission (including reception and/or transmission) by using the transceiver 2001. Further, the apparatus may further include a memory 2003, where the memory 2003 may include a read-only memory and a random access memory, and is configured to provide the processor 2002 with an instruction and data. The memory 2003 may be integrated into the processor 2002, or may be independent of the processor 2002. A part of the memory 2003 may further include a non-volatile random access memory (NVRAM). Components of the apparatus are coupled together by using a bus system. In addition to a data bus, the bus system 2009 further includes a power bus, a control bus, and a status signal bus. However, for clear description, various types of buses in the figure are marked as the bus system 2009.

The process disclosed in the embodiment of this application in FIG. 11 may be applied to the processor 2002, or may be implemented by the processor 2002. In an implementation process, steps in the process implemented by the apparatus can be implemented by an integrated logic circuit of hardware in the processor 2002 or by an instruction in a software form. The processor 2002 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiment of this application in FIG. 11 may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 2003, and the processor 2002 reads information in the memory 2003 and completes the steps in the process described in the embodiments of the present application in combination with hardware of the processor 2002.

Further, when the apparatus is a user equipment STA, the apparatus may further include an input device, such as a keyboard, and an output device, such as a structure of a display, and details are not described herein.

The transceiver 2001 is configured to receive a wake-up packet sent by a second network node, where the wake-up packet includes a target parameter value, the target parameter value is an updated value of a communications parameter between the first network node and the second network node, and the communications parameter includes at least one parameter in a target wake up time TWT element and/or a transmission operation mode parameter of the second network node.

The transceiver 2001 is further configured to communicate with the second network node based on the target parameter value.

Optionally, if the communications parameter includes a target wake up time in the TWT element, the processor 2002 is configured to adjust, based on the target parameter value, a target awake time point at which a primary transceiver of the first network node performs communication with the second network node, and communicate with the second network node.

Optionally, if the communications parameter includes a minimum TWT wake duration in the TWT element, the processor 2002 is further configured to adjust, based on the target parameter value, minimum awake duration during which a primary transceiver of the first network node performs communication with the second network node, and communicate with the second network node.

Optionally, if the communications parameter includes a TWT wake interval mantissa and a TWT wake interval exponent in the TWT element, the processor 2002 is further configured to adjust, based on the target parameter value, an awake period interval at which a primary transceiver of the first network node performs communication with the second network node, and communicate with the second network node.

Optionally, the wake-up packet includes a TWT parameter overloading field, and the TWT parameter overloading field includes a parameter overloading bit; and when the parameter overloading bit indicates TWT parameter overloading, the TWT parameter overloading field includes the target parameter value that is the at least one updated parameter in the TWT element.

The processor 2002 is further configured to adjust, based on the target parameter value, a parameter for a primary transceiver of the first network node to perform communication with the second network node, and communicate with the second network node.

Further, optionally, the transmission operation mode parameter of the second network node includes a maximum quantity of transmittable streams and transmit power information.

The transmit power information is a maximum transmit power of the second network node or transmit power fluctuation indication information of the second network node, where the transmit power fluctuation indication information is used to indicate whether transmit power fluctuation is allowed during data transmission of the second network node.

In this embodiment of the present application, the first network node receives the wake-up packet sent by the second network node, where the wake-up packet includes the target parameter value, the target parameter value is the updated value of the communications parameter between the first network node and the second network node, and the communications parameter includes the at least one parameter in the target wake up time TWT element and/or the transmission operation mode parameter of the second network node; and the first network node communicates with the second network node based on the target parameter value. In this manner, the first network node may be notified of an updated communications parameter between the first network node and the second network node in a timely manner, ensuring that the first network node successfully communicates with the second network node.

It is understandable that reference may be made to related descriptions about the method embodiment of FIG. 11 for a specific implementation of the components in the foregoing data communication apparatuses, and details are not described herein again.

An embodiment of the present application further provides a data communication method. The data communication method includes the following steps:

Step 1: A first network node receives a wake-up packet sent by a second network node, where the wake-up packet includes cancellation instruction information, and the cancellation instruction information is used to instruct to cancel a target wake up time TWT that is pre-established between the first network node and the second network node.

Step 2: A primary transceiver of the first network node communicates with the second network node based on the cancellation instruction information.

For example, when detecting that a new TWT needs to be established, the first network node establishes the new TWT with the second network node, and communicates with the second network node based on the new TWT.

In an embodiment, the cancellation instruction information may be one or more bits. For example, the wake-up packet includes a TWT parameter cancellation field, the TWT parameter cancellation field may include cancellation instruction information, and the cancellation instruction information is used to cancel a TWT that is pre-established between an AP and a primary transceiver of a STA. Then, if there is a requirement, for example, there is a new duty cycle service or an energy-saving requirement, the AP re-negotiates with the primary transceiver of the STA to establish a new TWT, and performs communication based on the new TWT.

Based on the data communication method in this embodiment of the present application, an embodiment of the present application further provides a data communication apparatus. The data communication apparatus includes a receiving unit and a communications unit.

The receiving unit is configured to receive a wake-up packet sent by a second network node, where the wake-up packet includes cancellation instruction information, and the cancellation instruction information is used to instruct to cancel a target wake up time TWT that is pre-established between a first network node and the second network node.

The communications unit is configured to communicate with the second network node based on the cancellation instruction information.

For example, when detecting that a new TWT needs to be established, the first network node establishes the new TWT with the second network node, and communicates with the second network node based on the new TWT.

A person of ordinary skill in the art may understand that all or some of the processes of the methods in the embodiments may be implemented by a computer program instructing relevant hardware. The program may be stored in a computer readable storage medium. When the program is executed, the processes of the methods in the embodiments are performed. The storage medium includes: various media that can store program code, such as a read only memory (ROM), a random access memory (RAM), a magnetic disk, or an optical disc.

What is claimed is:

1. A data communication method applied to a station (STA), wherein the STA comprises a primary transceiver and a wake-up receiver, and the method comprises:
   receiving, by the wake-up receiver during a sleep state of the primary transceiver of the STA, a wake-up packet sent by an access point (AP),
      wherein the wake-up packet comprises basic service set (BSS) parameter indication information for a BSS,
      wherein the BSS parameter indication information comprises BSS parameter change indication information indicating whether at least one critical parameter of the BSS changes, and
      wherein the BSS parameter change indication information comprises a first change count value representing a quantity of change times of at least one critical parameter of the BSS;
   waking up, by the wake-up receiver of the STA, the primary transceiver; and
   communicating, by the primary transceiver of the STA, with the AP based on a latest of the at least one critical parameter in response to a second change count value being different from the first change count value,
      wherein the second change count value represents a quantity of change times of the at least one critical parameter of the BSS during an awake state of the STA.

2. The method according to claim 1, wherein before communicating with the AP based on the BSS parameter indication information, the method further comprises:
   in response to the second change count value being different from the first change count value, obtaining, by the primary transceiver of the STA, the latest of the at least one critical parameter of the BSS.

3. The method according to claim 1, wherein before communicating with the AP, the method further comprises:
   determining, by the STA, whether the second change count value is the same as the first change count value;
   in response to the second change count value being the same as the first change count value, determining, by the STA, that the at least one critical parameter of the BSS does not change; and
   in response to the second change count value being different from the first change count value, determining, by the STA, that the at least one critical parameter of the BSS to which the primary transceiver belongs changes.

4. The method according to claim 1, further comprising:
   receiving, by the primary transceiver of the STA in the awake state, a frame sent by the AP, wherein the frame comprises a third change count value representing the quantity of change times of the at least one critical parameter of the BSS; and
   replacing, by the STA, the second change count value with the third change count value.

5. The method according to claim 1, wherein the at least one critical parameter of the BSS comprises a channel parameter of the BSS or an enhanced distributed channel access (EDCA) parameter of a contention channel of the BSS; and
   the channel parameter of the BSS comprises at least one of: a channel number, a secondary channel offset indication, a channel bandwidth, a channel central frequency, and a frequency band number of the BSS; and
   the EDCA parameter of the BSS comprises at least one of: quality of service (QoS) information, an access category best effort traffic (AC_BE) parameter, an access category background traffic (AC_BK) parameter, an access category video traffic (AC_VI) parameter, and an access category voice traffic (AC_VO) parameter of the contention channel of the BSS.

6. A data communication method applied to an access point (AP), the method comprising:
   generating, by the AP, a wake-up packet;
   sending, by the AP, the wake-up packet to a station (STA),
      wherein the wake-up packet comprises basic service set (BSS) parameter indication information for a BSS,
      the BSS parameter indication information comprises BSS parameter change indication information that indicates whether at least one critical parameter of the BSS has changed, and
      wherein the BSS parameter change indication information comprises a first change count value representing a quantity of change times of at least one critical parameter of the BSS; and
   communicating, by the AP, with the STA based on a latest of the at least one critical parameter in response to a second change count value being different from the first change count value,
      wherein the second change count value represents a quantity of change times of the at least one critical parameter of the BSS during an awake sleep state of the STA.

7. The method according to claim 6, further comprising:
   incrementing, by the AP, the first change count value by a fixed preset value in response to a change of a critical parameter of the BSS.

8. The method according to claim 7, wherein the fixed preset value is 1, 2 or 3.

9. The method according to claim 6, further comprising:
   sending, by the AP, a frame comprising a third change count value representing a quantity of change times of the at least one critical parameter of the BSS,
      wherein the third change count value indicates to the STA to replace the second change count value of the STA with the third change count value.

10. The method according to claim 6, wherein the at least one critical parameter of the BSS comprises a channel parameter of the BSS or an enhanced distributed channel access (EDCA) parameter of a contention channel of the BSS,
   wherein the channel parameter of the BSS comprises at least one of: a channel number, a secondary channel offset indication, a channel bandwidth, a channel central frequency, and a frequency band number of the BSS; and
   wherein the EDCA parameter of the BSS comprises at least one of: quality of service (QoS) information, an access category best effort traffic (AC_BE) parameter, an access category background traffic (AC_BK) parameter, an access category video traffic (AC_VI) parameter, and an access category voice traffic (AC_VO) parameter of the contention channel of the BSS.

11. A data communication apparatus comprising: a primary transceiver, a wake-up receiver, a processor and a memory, wherein the memory stores processor-executable program code which when executed by the processor causes the apparatus to provide at least the following operations:
   cooperate with the processor to receive a wake-up packet sent by an access point (AP) during a sleep state of the primary transceiver,
      wherein the wake-up packet comprises basic service set (BSS) parameter indication information for a BSS,
      wherein the BSS parameter indication information comprises BSS parameter change indication information which indicates whether at least one critical parameter of the BSS changes, and
      wherein the BSS parameter change indication information comprises a first change count value representing a quantity of change times of at least one critical parameter of the BSS;
   wake up the primary transceiver of the apparatus; and
   communicate, by the primary transceiver of the apparatus, with the AP based on a latest of the at least one critical parameter in response to a second change count value being different from the first change count value,
      wherein the second change count value represents a quantity of change times of the at least one critical parameter of the BSS during an awake state of the apparatus.

12. The apparatus according to claim 11, wherein the apparatus provides the following further operation before communicating with the AP based on the latest of the at least one critical parameter in response to the second change count value being different from the first change count value:
   obtain the latest of the at least one critical parameter of the BSS.

13. The apparatus according to claim 12, wherein the apparatus provides the following further operations:
   determine whether the second change count value is the same as the first change count value;
   determine that the at least one critical parameter of the BSS does not change if the second change count value is the same as the first change count value; and determine that the at least one critical parameter of the BSS changes if the second change count value is different from the first change count value.

14. The apparatus according to claim 11, wherein the apparatus provides the following further operations:
receive, in the awake state, a frame sent by the AP, wherein the frame comprises a third change count value representing a quantity of change times of the at least one critical parameter of the BSS,
wherein the processor is configured to replace the second change count value with the third change count value.

15. The apparatus according to claim 11, wherein the at least one critical parameter of the BSS comprises a channel parameter of the BSS or an enhanced distributed channel access (EDCA) parameter of a contention channel of the BSS; and
the channel parameter of the BSS comprises at least one of: a channel number, a channel offset indication, a channel bandwidth, a channel central frequency, and a frequency band number of the BSS; and
the EDCA parameter of the BSS comprises at least one of quality of: service (QoS) information, an access category best effort traffic (AC_BE) parameter, an access category background traffic (AC_BK) parameter, an access category video traffic (AC_VI) parameter, or an access category voice traffic (AC_VO) parameter of the contention channel of the BSS.

16. A data communication apparatus comprising: a memory and a processor, wherein the memory stores processor-executable program code that, when executed by the processor, causes the apparatus to provide at least the following operations:
generating a wake-up packet;
sending the wake-up packet to a station (STA),
wherein the wake-up packet comprises basic service set (BSS) parameter indication information for a BSS, the BSS parameter indication information comprises BSS parameter change indication information that indicates whether at least one critical parameter of the BSS has changed, and
wherein the BSS parameter change indication information comprises a first change count value representing a quantity of change times of at least one critical parameter of the BSS; and
communicating with the STA based on a latest of the at least one critical parameter in response to a second change count value being different from the first change count value,
wherein the second change count value represents a quantity of change times of the at least one critical parameter of the BSS during an awake state of the STA.

17. The apparatus according to claim 16, wherein the operations further include incrementing the first change count value by a fixed preset value in response to a change of a critical parameter of the BSS.

18. The apparatus according to claim 17, wherein the fixed preset value is 1, 2 or 3.

19. The apparatus according to claim 18, wherein the operations further include:
sending a frame comprising a third change count value representing a quantity of change times of the at least one critical parameter of the BSS,
wherein the third change count value indicates to the STA to replace the second change count value of the STA with the change count value.

20. The apparatus according to claim 16, wherein the at least one critical parameter of the BSS comprises a channel parameter of the BSS or an enhanced distributed channel access (EDCA) parameter of a contention channel of the BSS; and
the channel parameter of the BSS comprises at least one of: a channel number, a secondary channel offset indication, a channel bandwidth, a channel central frequency, and a frequency band number of the BSS; and
the EDCA parameter of the BSS comprises at least one of: quality of service (QoS) information, an access category best effort traffic (AC_BE) parameter, an access category background traffic (AC_BK) parameter, an access category video traffic (AC_VI) parameter, and an access category voice traffic (AC_VO) parameter of the contention channel of the BSS.

21. A data communication method applied to a station (STA), the method comprises:
receiving, by the STA, a wake-up packet sent by an access point (AP) during a sleep state of the STA,
wherein the wake-up packet comprises basic service set (BSS) parameter indication information for a BSS,
wherein the BSS parameter indication information comprises BSS parameter change indication information indicating whether at least one critical parameter of the BSS changes, and
wherein the BSS parameter change indication information comprising a first change count value representing a quantity of change times of the at least one critical parameter of the BSS;
waking up the STA; and
communicating, by the STA, with the AP based on a latest of the at least one critical parameter in response to a second change count value being different from the first change count value,
wherein the second change count value represents a quantity of change times of the at least one critical parameter of the BSS during an awake state of the STA.

22. A data communication apparatus comprising a processor and a memory, wherein the memory stores processor-executable program code which when executed by the processor causes the apparatus to provide at least the following operations:
receive, a wake-up packet sent by an access point (AP) during a sleep state of the apparatus,
wherein the wake-up packet comprises basic service set (BSS) parameter indication information for a BSS,
wherein the BSS parameter indication information comprises BSS parameter change indication information indicating whether at least one critical parameter of the BSS changes, and
wherein the BSS parameter change indication information comprising a first change count value representing a quantity of change times of at least one critical parameter of the BSS; and
communicate with the AP based on a latest of the at least one critical parameter in response to a second change count value being different from the first change count value,
wherein the second change count value represents a quantity of change times of the at least one critical parameter of the BSS during an awake state of the apparatus.

* * * * *